United States Patent
Manton et al.

(10) Patent No.: US 9,922,003 B2
(45) Date of Patent: Mar. 20, 2018

(54) METHOD AND APPARATUS FOR IDENTIFYING PULSES IN DETECTOR OUTPUT DATA

(75) Inventors: Jonathan Huntley Manton, Doncaster East (AU); Christopher Charles McLean, Kennington (AU); Paul Andrew Basil Scoullar, Fitzroy North (AU)

(73) Assignee: Southern Innovation International Pty Ltd, Carlton North (AU)

( * ) Notice: Subject to any disclaimer, the term of this patent is extended or adjusted under 35 U.S.C. 154(b) by 806 days.

(21) Appl. No.: 14/125,694

(22) PCT Filed: Jun. 14, 2012

(86) PCT No.: PCT/AU2012/000678
§ 371 (c)(1),
(2), (4) Date: Dec. 12, 2013

(87) PCT Pub. No.: WO2012/171059
PCT Pub. Date: Dec. 20, 2012

(65) Prior Publication Data
US 2014/0107975 A1    Apr. 17, 2014

Related U.S. Application Data

(60) Provisional application No. 61/497,029, filed on Jun. 14, 2011.

(51) Int. Cl.
*G06F 17/18*    (2006.01)
*G06F 19/00*    (2018.01)
*G01D 3/10*    (2006.01)
*G01T 1/17*    (2006.01)

(52) U.S. Cl.
CPC ............... *G06F 17/18* (2013.01); *G01D 3/10* (2013.01); *G01T 1/17* (2013.01)

(58) Field of Classification Search
CPC .. G01D 3/10; G06F 17/18; G01T 1/17; G01T 1/171; G01T 1/366; G01V 1/28
See application file for complete search history.

(56) References Cited

U.S. PATENT DOCUMENTS

| | | | |
|---|---|---|---|
| 2002/0052701 A1* | 5/2002 | Gorenstein | G01N 30/82 702/74 |
| 2007/0005278 A1* | 1/2007 | Brunnett | A61B 6/032 702/78 |
| 2010/0100336 A1 | 4/2010 | Wright et al. | |

(Continued)

OTHER PUBLICATIONS

Cizek et al., "Digital setup for Doppler broadening spectroscopy", 2011, Journal of Physics: Conference Series 262 (2011) 012014.*

(Continued)

*Primary Examiner* — David M Gray
*Assistant Examiner* — Geoffrey T Evans
(74) *Attorney, Agent, or Firm* — Knobbe Martens Olson & Bear LLP

(57) ABSTRACT

A method for locating a pulse in detector output data, comprising fitting one or more functions to the detector output data; and determining a location and an amplitude of a peak of said pulse from said one or more functions. The one or more functions may be are a function of time.

17 Claims, 16 Drawing Sheets

(56) References Cited

U.S. PATENT DOCUMENTS

2012/0298875 A1* 11/2012 Ueno ............... G01T 1/17
250/362
2016/0313459 A1* 10/2016 Scoullar ............... G01T 1/17

OTHER PUBLICATIONS

Belli et al., "A method for digital processing of pile-up events in organic scintillators", 2008, Nuclear Instruments and Methods in Physics Research A 595 (2008) 512-519.*

Bolic, M. et al., Pileup Correction Algorithms for Very-High-Count-Rate Gamma-Ray Spectrometry With NaI(Ti) Detectors, 2010, IEEE Transactions on Instrumentation and Measurement, vol. 59, No. 1.

Bousselham, A., FPGA based data acquisition and digital pulse processing for PET and SPECT, 2007, PhD Thesis, Stockholm University, retrieved from: su.diva-portal.org/smash/getldiva2:196765/FULLTEXT01.

International Search Report & Written Opinion dated Sep. 5, 2012 for International Patent Application No. PCT/AU2012/000678 filed Jun. 14, 2012.

Knoll, G.F., Radiation Detection and Measurement, $3^{rd}$ edition, Chapter 17, pp. 632-634 and 658-659, John Wiley and Sons, New York, 2000.

Pullia, A. et al., Quasioptimum y and X Spectroscopy Based on Real-Time Digital Techniques, Nucl. Inst. and Meth., A 439, (2000), pp. 378-384.

Raad, M. W. et al., A novel approach for pileup detection in gamma-ray spectroscopy using deconvolution, 2008, Meas. Sci. Technol., vol. 19.

Saito, Naoki, Superresolution of Noisy Band-Limited Data by Data Adaptive Regularization and its Application to Seismic Trace Inversion, CH2847-2/90/000-123, 1990.

Sasamoto, N. et al., An Analysis Method of Gamma-Ray Pulse-Height Distributions Obtained with a Ge(Li) Detector, 1975, Nuclear Instruments and Methods, vol. 125, pp. 507-523.

Wong, W. H. and Li H., A Scintillation Detector Signal Processing Technique with Active Pileup Prevention for Extending Scintillation Count Rates, 1998, IEEE Transactions on Nuclear Science, vol. 45, No. 3, pp. 838-842.

* cited by examiner

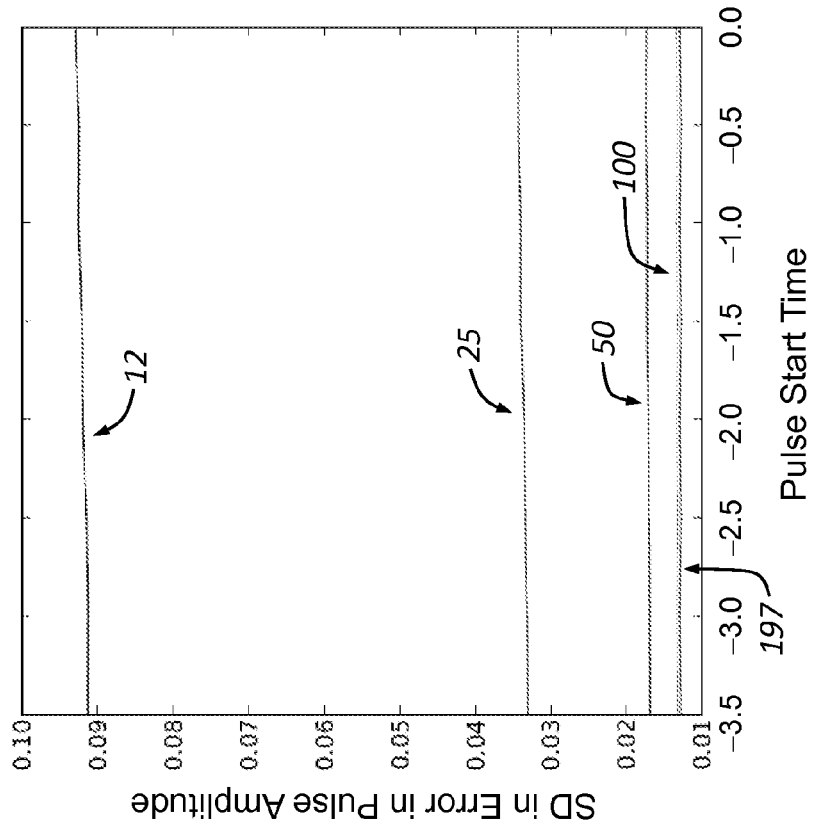
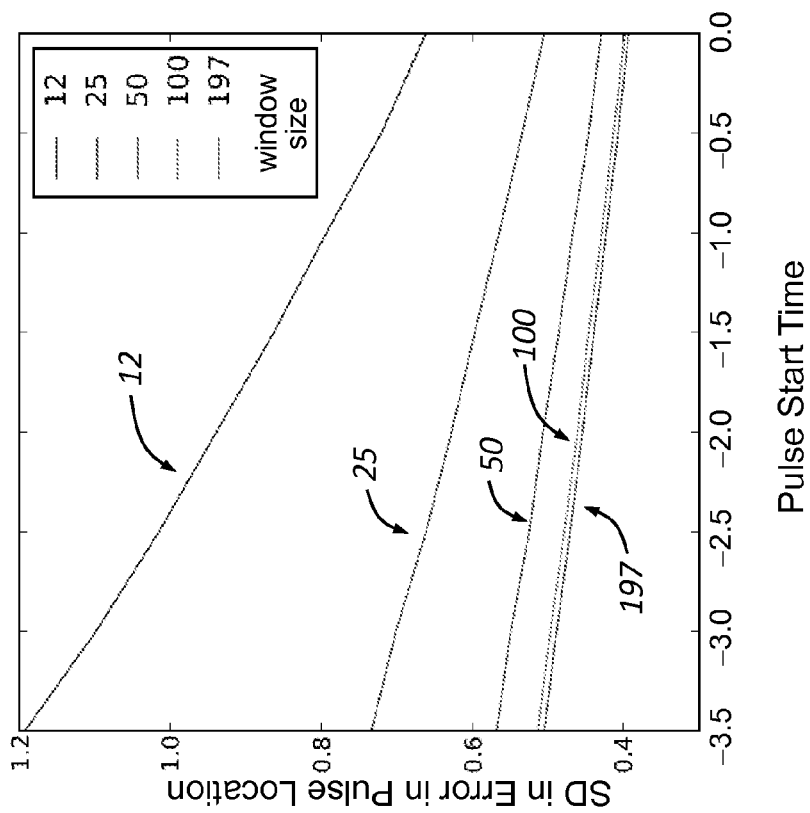
Figure 3A
Figure 3B

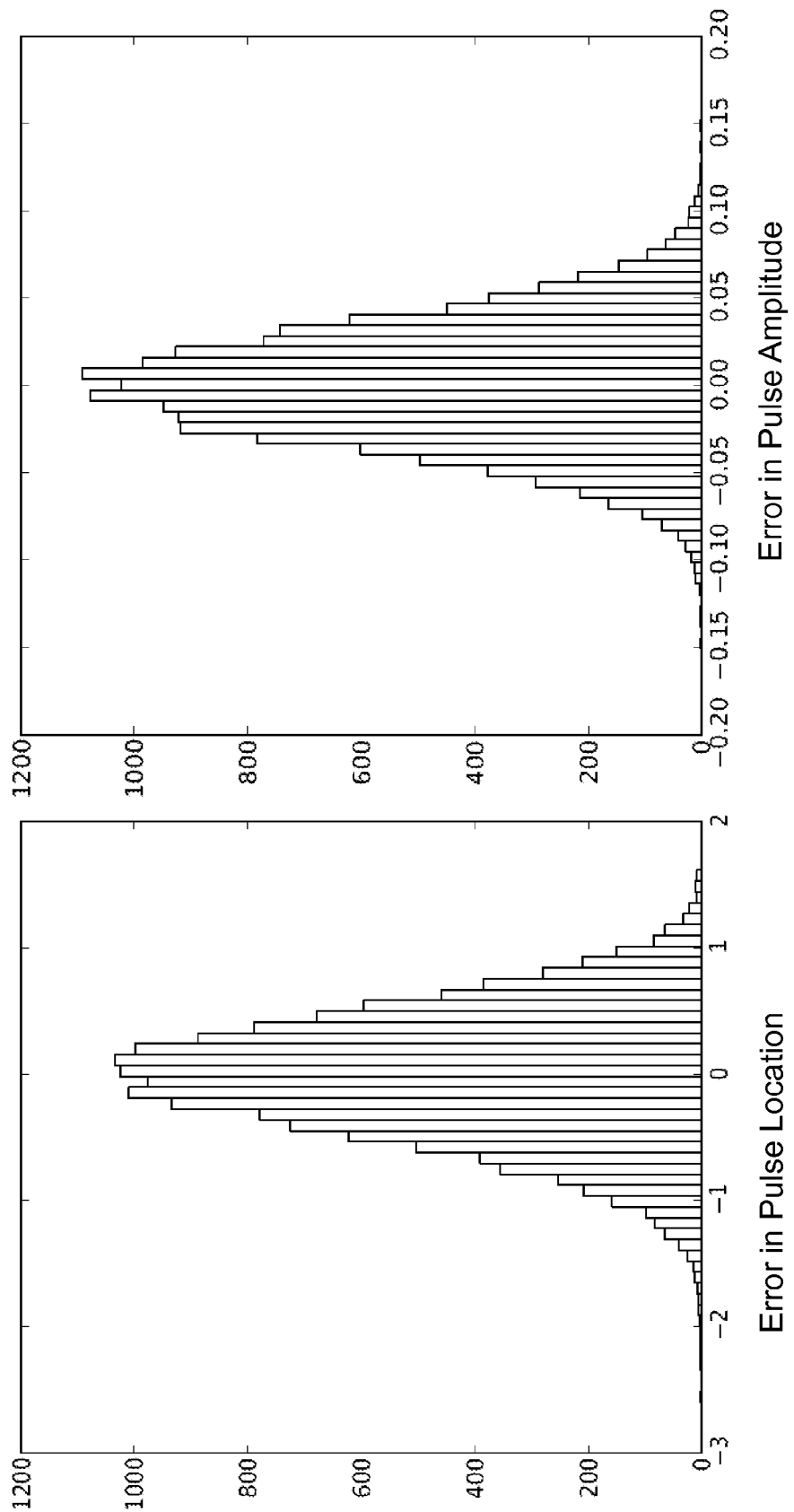

METHOD AND APPARATUS FOR IDENTIFYING PULSES IN DETECTOR OUTPUT DATA

CROSS REFERENCE TO RELATED APPLICATIONS

This application is the National Phase of PCT/AU2012/000678 filed on Jun. 14, 2012, which claims priority under 35 U.S.C. § 119(e) to U.S. Provisional Application No. 61/497,029 filed on Jun. 14, 2011.

TECHNICAL FIELD

The present invention relates generally to a method and apparatus for determining the location and amplitude of pulses from (typically noisy) detector output data, for use—in particular though not exclusively—for the recovery of data from a radiation detector affected by pulse pile-up.

BACKGROUND

The accurate detection and measurement of radiation, vibration or other types of energy are employed in many industries, including homeland security, scientific instrumentation, medical imaging, materials analysis, meteorology, information and communication technology (ICT), and the mineral processing industry. These and other industries use such detection and measurement to analyze materials, structures, products, information, signals or other specimens. Transmission based imaging, spectroscopic analysis or other modalities can be used to perform such analysis.

In mineral and oil exploration, borehole logging techniques use gamma-rays and neutrons to determine the subsurface composition of rocks and mineral deposits. Data on the porosity and density of rock formations can be determined from nuclear borehole logging techniques, and this is then used to help detect the presence of geological reservoirs and their contents (e.g., oil, gas or water).

SONAR (sound navigation and ranging) is commonly used in navigation and for locating objects within a body of water. SODAR, or sonic detection and ranging, can be used to measure the scattering of sound waves by atmospheric turbulence and, for example, to measure wind speed at various heights above the ground, and the thermodynamic structure of the lower layer of the atmosphere.

Ultrasound may be used for medical imaging or other purposes, such as to form images of foetuses, to find locate flaws in or measure the thickness of certain types of objects, or to locate objects in real-time (in manufacturing environments, for example).

Spectroscopy is commonly used to analyze materials. Knowledge about a material can be obtained by analysis of radiation emission from or absorption by elements within the specimen. The emission of radiation can be stimulated emission due to some form of incident radiation or natural emission from the constituent elements.

Two standard stimulated emission spectroscopy techniques are X-ray fluorescence (XRF) and Particle-induced X-ray emission (PIXE). These techniques are used in the analysis of materials in the ICT and minerals exploration and processing industries. In these techniques, knowledge of the material is obtained by detection and analysis of secondary (or fluorescent) X-rays emitted from the material after that material has been energized by stimulation with high energy photons or particles.

Gamma-ray spectroscopy, for example, is a form of spectroscopy in which the emitted electromagnetic radiation is in the form of gamma-rays. In gamma-ray spectroscopy the detection of gamma rays is commonly performed with a scintillation crystal (such as thallium-activated sodium iodide, NaI(TI)), though there are a number of other detector types that can also be used. NaI(TI) crystals generate ultraviolet photons pursuant to incident gamma-ray radiation. These photons are then received by a photomultiplier tube (PMT) which generates a corresponding electrical signal or pulse. As a result, the interaction between the photons and the detector gives rise to pulse-like signals, the shape of which is determined by the incident gamma-ray radiation, the detecting crystal and the PMT. The fundamental form of these pulse-like signals is referred to as the impulse response of the detector.

The output from the photomultiplier is an electrical signal representing the summation of input signals, of determined form, generated in response to discrete gamma rays arriving at the scintillation crystal. By analysing the detector output over time, and in particular the amplitudes of the component signals, it is possible to deduce information regarding the chemical composition of the material being analysed.

Analysis by gamma-ray spectroscopy requires the characterization of the individual pulse-like signals generated in response to incident gamma-rays. Signal parameters of particular interest include signal amplitude, number and time of occurrence or temporal position (whether measured as time of arrival, time of maximum or otherwise). If the arrival times of two gamma-rays differ by more than the response time of the detector, analysis of the detector output is relatively straightforward. However, in many applications a high flux of gamma-rays cannot be avoided, or may be desirable so that spectroscopic analysis can be performed in a reasonable time period. As the time between the arrivals of gamma-rays decreases, characterization of all resultant signals becomes difficult.

In particular, the analysis is affected by a phenomenon known as pulse pile-up [see, for example, G. F. Knoll, *Radiation Detection and Measurement,* 3rd edition, Chapter 17, pp. 632-634, 658 and 659, John Wiley and Sons, New York 2000], whereby multiple gamma-rays arriving more or less simultaneously produce signals which sum together and may be inadvertently counted as a single signal. The magnitude of this combined signal is greater than the individual components, leading to errors in later analysis.

The energy of an incident gamma-ray is generally represented by the amplitude of the corresponding pulse-like signal produced by the detector. The presence of specific gamma-ray energies within the detector signal is indicative of particular elements in the material from which gamma-rays originate. Thus, a failure to differentiate a large amplitude signal caused by a single scintillation event from the superposition of multiple events can have a serious effect on the accuracy of subsequent spectroscopic analysis.

Although the effects of pile-up have been described above in the context of photomultiplier detectors and gamma-ray detectors, they apply equally to other types of detectors for these and other forms of radiation, including x-ray detectors such as lithium-drifted silicon crystal detectors, and surface barrier detectors, for example. Additionally, as will be understood by those skilled in the art, a reference to "output of a detector" may include the output of a pre-amplifier connected to a basic detector component such as a lithium-drifted silicon or germanium crystal, or a bare surface barrier detector).

Some existing techniques aim to prevent corruption of the spectroscopic analysis due to pulse pile-up. Certain pulse shaping electronics have been shown to reduce the response time of the detector resulting in a diminished prevalence of pile-up in the final spectrum [A. Pullia, A. Geraci and G. Ripamonti, *Quasioptimum γ and X-Ray Spectroscopy Based on Real-Time Digital Techniques*, Nucl. Inst. and Meth. A 439 (2000) 378-384]. This technique is limited, however, by detector response time. Another approach is 'pulse pile-up rejection' whereby signals suspected to contain pulse pipe-up are discarded. Only signals free from pulse pile-up are used in spectroscopic analysis. However, as the rate of radiation incident on the detector increases, so too does the likelihood that pulse pile-up will occur and the more it is necessary to discard data. Accordingly, existing pulse pile-up rejection is of limited usefulness since a state is quickly reached beyond which a higher incident radiation flux ceases to reduce the time needed for analysis, as an increasing percentage of data must be rejected.

Moreover, the increasing 'dead time' during which no usable data is received but the sample continues to be irradiated results in the sample or material being analysed being subjected to a larger dose or fluence of radiation and is strictly necessary. In situations where the sample or material experiences radiation damage during analysis, this can be a serious consequence. Furthermore, in some circumstances (e.g., high energy particle physics experiments), the detectors themselves can be subject to substantial radiation damage, and the greater the dead time, the less useful data can be provided by such detectors during their lifetime.

Pulse pile-up is also a problem in seismic data collection; Naoki Saito (in *Superresolution of Noisy Band-Limited Data by Data Adaptive Regularization and its Application to Seismic Trace Inversion*, CH2847-2/90/0000-123, 1990) teaches a technique for resolving closely placed spikes in a seismic trace. The disclosed technique employs data adaptive regularization to recover missing frequency information in the presence of noise and, through repeated iteration, obtain improved resolution. However, this approach is computationally intensive.

It is desired to provide a method and apparatus for locating a pulse in detector output data that alleviate one or more difficulties of the prior art, or that at least provide a useful alternative.

SUMMARY

According to a first aspect of the invention, therefore, there is provided a method for locating a pulse in detector output data, comprising:
fitting (such as by least squares) one or more functions to the detector output data; and
determining a location and an amplitude of a peak of said pulse from the one or more functions determined by said fitting.

In one set of embodiments, the one or more functions are functions of time.

In some of those embodiments, however, the skilled person will appreciate that the one or more functions may not be functions exclusively of time.

The method may comprise providing the detector output data in, or converting the detector output data into digital form before fitting the one or more functions to the detector output data.

In some embodiments, the method comprises:
generating said detector output data by applying a mathematical transform to second detector output data, said mathematical transform being selected according to an expected form of said pulse.

In some embodiments, said fitting includes:
fitting a plurality of functions to the detector output data; and
determining a function of best fit, being whichever of said plurality of functions optimises a chosen metric when modelling said data; and
said determining includes determining the location and amplitude of said peak from the determined function of best fit.

In some embodiments, the method comprises:
determining error residuals from said fitting; and
determining a baseline offset of said detector output from said error residuals.

In one embodiment, the one or more functions are of the form:

$$f(t)=av(t)+be^{-\alpha t}.$$

In this embodiment, v(t) may be calculated numerically, such as by the formula $$v(t) = e^{-\alpha t} \sum_{k=0}^{t-1} e^{-(\beta-\alpha)k}$$

for t=0, 1, 2, . . . (with v(0)=0).

Although mathematically, $$v(t) = \frac{1}{1-e^{-(\beta-\alpha)}}(e^{-\alpha t} - e^{-\beta t})$$

whenever β≠α, the above formula may be used to evaluate v(t) numerically. Furthermore, the above formula remains correct even when α=β, reducing in that instance to v(t)=te$^{-\alpha t}$.

In one embodiment, the one or more functions are of the form:

$$f(t)=av(t)+be^{-\alpha t},$$

and the method includes determining a location and amplitude of the pulse with a method comprising:
defining a reference pulse p(t) as a convolution of e$^{-\alpha t}$u(t) with e$^{-\beta t}$u(t) (as further discussed in the Appendix),
determining the location τ and amplitude A of f(t) from f(t)=Ap(t−τ), with τ≤0.

The skilled person will appreciate that the present aspect of the invention contemplates different but mathematically equivalent expressions of this approach.

The skilled person will also appreciate that:

$$p(t) = \frac{1}{\beta-\alpha}(e^{-\alpha t} - e^{-\beta t})u(t), \text{ when } \alpha \neq \beta, \text{ and}$$

$$p(t) = te^{-\alpha t}, \text{ when } \alpha = \beta.$$

Expanding f(t)=Ap(t−τ) gives the two equations:

$$\frac{1-e^{-(\beta-\alpha)\tau}}{\beta-\alpha} = \gamma\frac{-b}{a}, \quad (1)$$

-continued
$$A = \gamma^{-1} e^{-\beta\tau} a, \quad (2)$$

where $$\gamma = \frac{1 - e^{-(\beta-\alpha)}}{\beta - \alpha}.$$

In the limit as $\beta$ becomes equal to $\alpha$, the constant $\gamma$ becomes 1, and equation (1) becomes $$\tau = \frac{-b}{a}.$$

This form is therefore suitable for use in a numerically stable method for a calculating $\tau$.

If $|\beta-\alpha|$ is very small, care needs to be taken with the calculation of $\gamma$. This may be done by summing the first few terms in the Taylor expansion:

$$\gamma = 1 - \frac{1}{2!}(\beta - \alpha) + \frac{1}{3!}(\beta - \alpha)^2 - \square.$$

Solving equation (1) can be done numerically, such as with a bisection method, especially since the left hand side is monotonic in $\tau$. Determining the left hand side for different values of $\tau$ may be done by any suitable technique, such as with a Taylor series expansion for small $\tau$. (In practice, the value of $\tau$ will generally be small because noise will generally preclude accurate characterization of a pulse that started in the distant past.)

The linear approximation in $\tau$ of equation (1) is $$\tau = \gamma \frac{-\gamma}{a},$$

and is exact if $\beta=\alpha$. The exact, general solution (theoretically) is $$\tau = \frac{-1}{\beta - \alpha} \ln\left(1 + \gamma(\beta - \alpha)\frac{b}{a}\right),$$

the Taylor series expansion of which is:

$$\tau = \gamma \frac{-\gamma}{a}\left(1 - \frac{1}{2}x + \frac{1}{3}x^2 - \frac{1}{4}x^3 + \ldots\right), x = \frac{\gamma(\beta - \alpha)b}{a}$$

which is valid provided $|x|<1$.

The method may comprise constraining $\tau$ by requiring that $\tau \in [\tau^*, 0]$.

Thus, because the left-hand side of equation (1) is monotonic in $\tau$, the constraint that $\tau \in [\tau^*, 0]$ is equivalent to the constraint on a and b that $0 \leq b \leq ca$ where the scalar c is given by $$c = -\gamma^{-1}\frac{1 - e^{-(\beta-\alpha)\tau^*}}{\beta - \alpha}$$

$$= \frac{e^{-(\beta-\alpha)\tau^*} - 1}{1 - e^{-(\beta-\alpha)}}.$$

Indeed, if $\tau^*=-1$ then $$c = \frac{e^{\beta-\alpha} - 1}{1 - e^{-(\beta-\alpha)}}$$

Thus, it is possible to provide a constrained optimisation.

This constraint can be implemented in with the constraints that $\alpha$ and $\beta$ are not negative and $\alpha > \beta$.

The method may also comprise constraining the amplitude of the pulse. This can be used, for example, to prevent a fitted pulse from being too small or too large. Indeed, referring to equation (2) above, if $\tau$ is constrained to lie between $-1$ and $0$ then A lies between $\gamma^{-1}a$ and $\gamma^{-a}e^\beta a$. Constraining a therefore constrains the amplitude A.

According to another particular embodiment, the function $f$ is in the form of a function with three exponentials. In a certain example of this embodiment, the time constants $\tau_1, \ldots, \tau_3$ are known and dissimilar (so fewer problems of numerical imprecision arise), and the method includes fitting the curve:

$$A_1 e^{-\tau_1 t} + \ldots + A_3 e^{-\tau_3 t}.$$

In another example of this embodiment, the time constants $\tau_1, \ldots, \tau_3$ are known and in ascending order such that $\tau_1 \leq \tau_2 \leq \tau_3$, and fitting the function $f$ includes using basis vectors:

$$v_1(t) = e^{-\tau_1 t} \sum_{k=0}^{t-1} e^{-(\tau_3 - \tau_1)k} \sum_{l=0}^{k-1} e^{-(\tau_3 - \tau_2)}$$

$$v_2(t) = e^{-\tau_1 t} \sum_{k=0}^{t-1} e^{-(\tau_2 - \tau_1)k}$$

$$v_3(t) = e^{-\tau_1 t}.$$

For reference, if the time-constants differ, then $$v_1(t) = \frac{\gamma_{31} - \gamma_{21}}{\gamma_{32}} \frac{1}{\gamma_{31}\gamma_{21}} e^{-\tau_1 t} - \frac{1}{\gamma_{32}\gamma_{21}} e^{-\tau_2 t} + \frac{1}{\gamma_{32}\gamma_{31}} e^{-\tau_3 t}$$

$$v_2(t) = \frac{1}{\gamma_{21}}(e^{-\tau_1 t} - e^{-\tau_2 t}), \text{ and}$$

$$v_3(t) = e^{-\tau_1 t}.$$

where $\gamma_{ji}=1-e^{-(\tau_j-\tau_i)}$.

Note, however, that—unlike the previous 'double-exponential' case, in which there were two unknowns (viz. the location and the amplitude of the pulse) and two equations (coming from the two basis vectors), in this 'three-exponential' case there are two unknowns but three equations. There are therefore many different ways of inverting these equations (thereby recovering the location and the amplitude of the pulse), and generally this will be the strategy that is robust to noise.

In another particular embodiment, the function $f$ is of the form:

$$f(t)=ae^{-\alpha t}-be^{-\beta t},$$

wherein $\alpha$ and $\beta$ are scalar coefficients, and the method comprises determining a and b.

This approach may not be suitable in applications in which $\alpha \approx \beta$, but in some applications it may be known that this is unlikely to occur, making this embodiment acceptable.

In one example of this embodiment, determining the location comprises determining a location $t_*(a,b)$ where:

$$t_*(a, b) = \frac{\ln\alpha - \ln\beta}{\alpha - \beta} + \frac{\ln a - \ln b}{\alpha - \beta}.$$

It will be appreciated that this embodiment, which uses $e^{-\alpha t}$ and $e^{-\beta t}$ has the disadvantage that these terms converge as $\beta$ approaches $\alpha$ (unlike the terms v(t) and $e^{-\alpha t}$ in the above-described embodiment, which remain distinct. Indeed, $e^{-\alpha t}$ might be said to correspond to the tail of a pulse that occurred at $-\infty$ (whereas v(t) represents a pulse occurring at time 0).

The function $f$ may be a superposition of a plurality of functions.

The method may include determining the pulse amplitude by evaluating $f=f(t)$ at $t=t_*(a,b)$.

Thus, the present invention relates generally to a method and apparatus for estimating the location and amplitude of a sum of pulses from noisy observations of detector output data. It presented the maximum-likelihood estimate as the benchmark (which is equivalent to the minimum mean-squared error estimate since the noise is additive white Gaussian noise).

The method may comprise low-pass filtering the data before fitting the one or more functions.

In one embodiment, however, the method comprises adapting the one or more functions to allow for a low frequency artefact in the detector output data. This may be done, in one example, by expressing the one or more functions as a linear combination of three exponential functions (such as $f(t)=ae^{-\alpha t}-be^{-\beta t}+ce^{-\gamma t}$).

In a certain embodiment, the method comprises forcing any estimates having the pulse starting within the window to start at a boundary of the window.

In a particular embodiment, the method comprises maximizing window size or varying window size.

In one embodiment, the method comprises transforming the detector output data with a transform before fitting the one or more functions to the detector output data as transformed.

This approach may be desirable in applications in which the analysis is simplified if conducted in transform space. In such situations, the method may also comprise subsequently applying an inverse transform to the one or more functions, though in some cases it may be possible to obtain the desired information in the transform space.

The transform may be a Laplace transform, a Fourier transform or other transform.

In one embodiment, estimating the location of the peak comprises minimizing an offset between the start of a window and a start of the pulse.

In a particular embodiment, the method further comprises detecting a pulse or pulses in the data by:

sliding a window across the data to successive window locations;

identifying possible pulses by performing pulse fitting to the data in the window at each window location;

determining which of the possible pulses have a pulse start falling before and near the start of the respective window location and a peak amplitude exceeding the standard deviation of the noise in the window at the respective window location; and identifying as pulses, or outputting, those of the possible pulses that have a pulse start falling one, two or three samples before the start of the respective window location and a peak amplitude exceeding the standard deviation of the noise in the window at the respective window location.

According to a second broad aspect, the invention provides a method for locating a pulse in detector output data, comprising:

fitting a plurality of functions to the data;

determining a function of best fit, being whichever of said functions optimises a chosen metric when modelling said data; and determining a location and an amplitude of a peak of said pulse from said function of best fit.

In one embodiment, each of the one or more functions is a superposition of a plurality of functions.

According to a third broad aspect, the invention provides a method for locating a pulse in detector output data, comprising:

producing transformed data by applying a mathematical transform to said data, said mathematical transform being selected according to an expected form of said pulse; and determining a location and an amplitude of a peak of said pulse from said transformed data (such as with the method of the first aspect of the invention).

According to a fourth broad aspect, the invention provides a method for determining baseline offset, comprising:

fitting one or more functions to detector output data according to the method of the first aspect;

determining error residuals from fitting said one or more functions; and determining said baseline offset from said error residuals.

It should be noted that any of the various features of each of the above aspects of the invention can be combined as suitable and desired.

BRIEF DESCRIPTION OF THE DRAWINGS

In order that the invention may be more clearly ascertained, some embodiments will now be described, by way of example only, with reference to the accompanying drawing, in which:

FIGS. 3A and 3B are plots from simulation of standard deviation of the error of the pulse location and pulse amplitude, respectively, against pulse start time obtained for window sizes of 12, 25, 50, 100 and 197 where each window starts at time 0, the standard deviation of the noise is $\sigma=0.1$ and the amplitude of the peak of the pulse is 1;

FIGS. 6A and 6B are histograms of the distribution (obtained via simulation) of the error in the pulse location and in the pulse amplitude, respectively, obtained using a window starting at the same time the pulse starts and having a size of 25, with a standard deviation of the noise of σ=0.1 and a pulse peak amplitude of 1;

DETAILED DESCRIPTION

Figure 1:
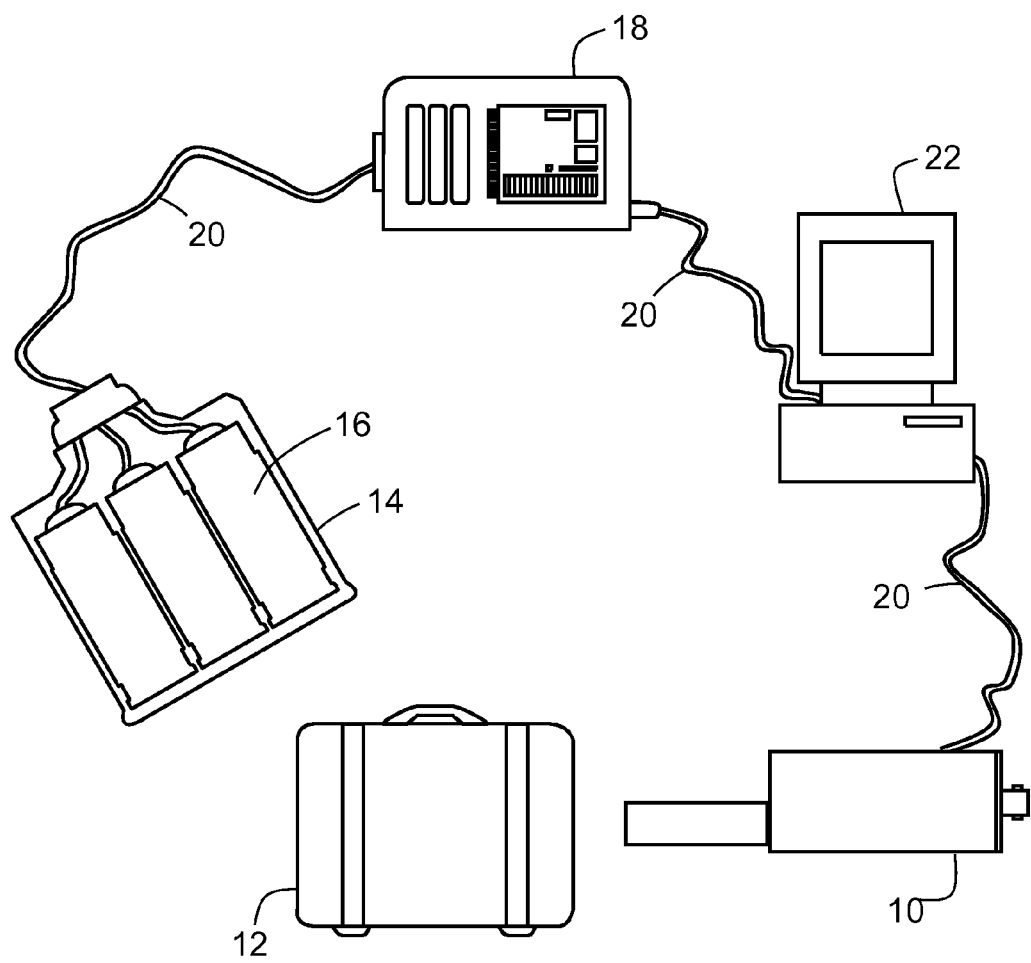
FIG. 1 is a view of a gamma-ray spectroscopy apparatus according to an embodiment of the present invention.

FIG. 1 is a schematic view of a gamma-ray spectroscopy apparatus adapted to perform pulse pile-up recovery according to an embodiment of the present invention, with an item to be analyzed. The apparatus of FIG. 1 includes a neutron generator 10 for generating neutrons for interacting with an item under analysis or specimen 12, and a detector unit 14, in the form of a scintillation based gamma-ray radiation detector, for detecting gamma-ray radiation resulting from the interaction of neutrons with the specimen 12. The detector unit 14 includes sensors or detector elements 16 that each has a scintillation crystal (in this example, sodium iodide) coupled to a photomultiplier tube (not shown). It will be appreciated that the apparatus could readily be modified, particularly by substituting a different form of detector unit, to detect other forms of radiation.

The apparatus also includes a signal processing unit 18 that comprises two parts: 1) an analogue to digital converter which produces a digital output corresponding to the analogue output of the detector unit, and 2) a processing unit which implements digital signal processing (DSP) routines in accordance with the embodiment.

The apparatus may include an analog to digital converter adapted to receive the data, to convert the data into digitized form, and forward the data in digitized form to the processor. This would be of particular use where the detector outputs analog data. The apparatus may include the typically radiation, sound or other detector. The processor may comprise a field programmable gate array (or an array thereof). Alternatively, the processor may comprise a digital signal processor (or an array thereof). In a further alternative, the processor comprises a field programmable gate array (or an array thereof) and a digital signal processor (or an array thereof). In still another embodiment, the processor comprises an ASIC (Application Specific Integrated Circuit). The apparatus may include an analog front end that includes the analog to digital converter. The apparatus may include an electronic computing device in data communication with the processor, for controlling the processor and for displaying an output of the processor.

The pulse pile up apparatus may be, for example, a metal detector, a landmine detector, an imaging apparatus (such as a medical imaging apparatus), a mineral detection apparatus, an oil well logging apparatus, an unexploded ordnance detector, a cargo screening apparatus, a baggage screening apparatus, an X-ray fluorescence apparatus, an X-ray diffraction apparatus, an X-ray absorption spectroscopy apparatus, an X-ray backscatter apparatus, a small angle neutron scattering apparatus, an oil exploration apparatus, a scanning electron microscope apparatus, a semiconductor radiation detector (such as a silicon drift detector apparatus or a Cadmium Zinc Telluride detector apparatus), a vibration detector such as a seismic reflection apparatus, a radio detection and ranging (RADAR) apparatus, a sound navigation and ranging (SONAR) apparatus, an elemental detection and measurement apparatus, a radiation safety detection apparatus, or a superconducting apparatus (such as a superconducting tunnel junction apparatus or a superconducting calorimeter).

The electrical output signals of the photomultiplier tubes are connected to the signal processing unit. The apparatus also includes cables 20 and a computer 22 for display, the former for coupling the output of signal processing unit 18 to computer 22.

Figure 2A:
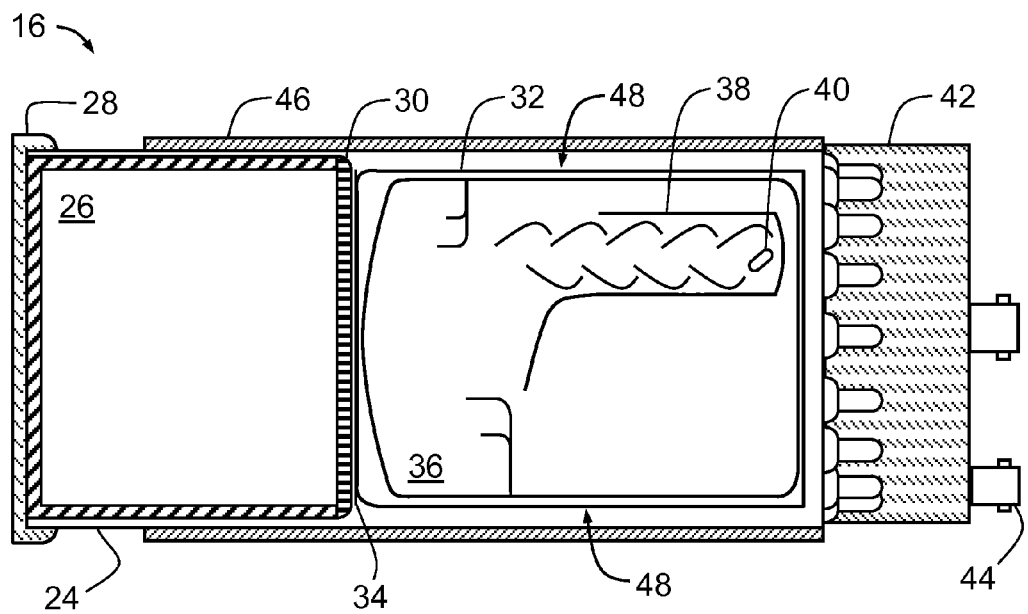
FIG. 2A is a view of a thallium-activated sodium iodide NaI(Tl) gamma-ray detector of the apparatus of FIG. 1.

FIG. 2A is a view of one of the detector elements 16. The illustrated detector element is in the form of a NaI(Tl) scintillation based gamma-ray detector, and comprises a cylindrical housing in the form of an aluminium body 24 with a NaI(Tl) crystal 26 located therein at one (forward) end positioned between an aluminium outer end cap 28 (forward of the NaI(Tl) crystal 26) and an inner optical window 30 (rearward of the NaI(Tl) crystal 26). The detector includes a photomultiplier tube 32 rearward of the optical window 30. Optical coupling fluid 34 may be used between the NaI(Tl) crystal 26 and the optical window 30, and between the optical window 30 and the photomultiplier tube 32.

When a gamma-ray interacts with the detector by passing into the detector through the end cap 28, energy is transferred from the gamma-ray to electrons within the NaI(Tl) crystal 26. The electrons lose that energy, promoting electrons within the crystal to excited states. Upon the emission of ultra-violet photons, the electrons decay to lower energy states. The aforementioned ultra-violet photons pass through the optical window to the photocathode 36 of the photomultiplier tube 32 where they are converted into photoelectrons and subsequently multiplied by an electron multiplier 38 before arriving at the anode 40 of the photomultiplier tube 32. A further multiplication stage can be provided by a preamplifier 42. In this manner an electrical signal, whose amplitude is proportional to the energy of the incident gamma-rays, is present at the detector output terminals 44 of the detector 16. It will also be appreciated that the detector 16 may additionally include a mu metal magnetic shield 46 located about the sides 48 of the photomultiplier tube 32 and extending forwardly of the photomultiplier tube 32 sufficiently far to surround a portion of the NaI(Tl) crystal 26.

Scintillation detectors of the kind last described have high efficiencies, that is, exhibit a high probability of detecting an incident gamma-ray. However, they also exhibit a relatively long detector response time. The detector response time is the time required by the detector to detect an incident gamma-ray and return to a state where the next incident gamma-ray can be accurately detected. Radiation detectors with long detector response times are thus prone to pulse pile-up. That is, the output, which ideally consists of completely discrete, non-overlapping pulses mutually spaced in time, each corresponding to the incidence of a single gamma-ray, instead exhibits a waveform in which individual pulses overlap, making them difficult to characterize.

Figure 2B:
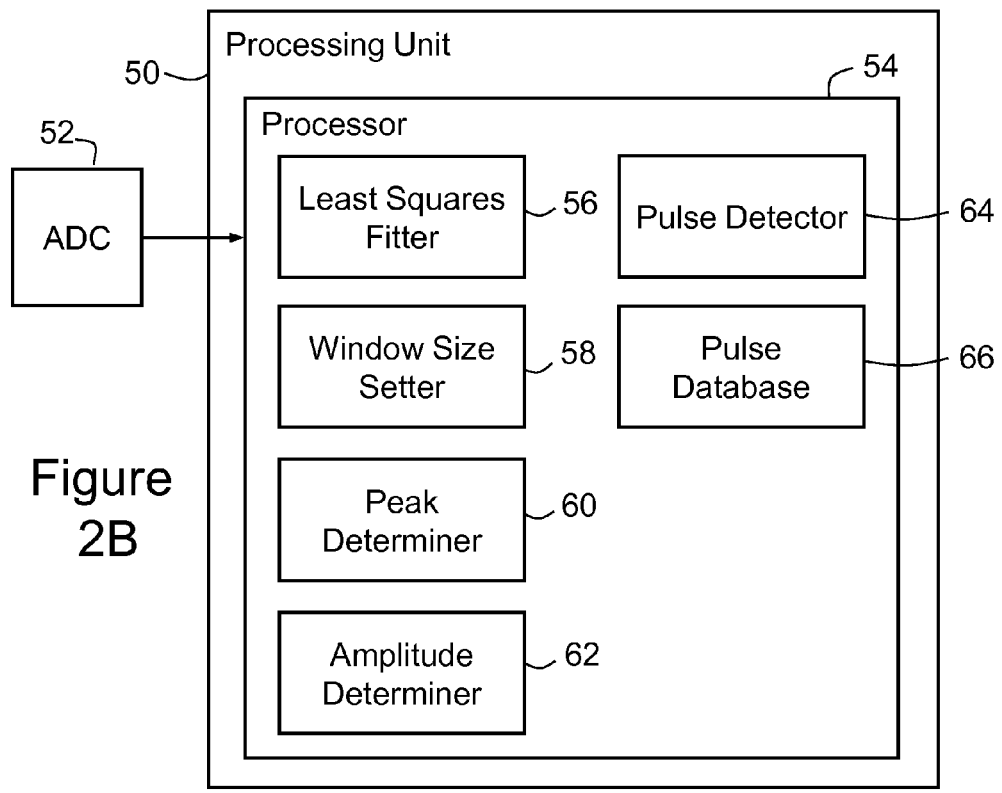
FIG. 2B is a schematic view of a processing unit of the signal processing unit of the apparatus of FIG. 1.

FIG. 2B is a schematic view of the processing unit 50 and ADC 52 of signal processing unit 18. Processing unit 50 is configured to determine the locations and amplitudes of overlapping pulses in the noisy output of detector unit 14, once converted into a digital output by the ADC of signal processing unit 18. Processing unit 50 implements the following model.

In view of the properties of detector unit 14 (and in particular of NaI(Tl) crystal 26), the canonical pulse p(t) is assumed to be of the form:

$$p(t) = \begin{cases} e^{-\alpha t} - e^{-\beta t}, & t \geq 0, \\ 0, & t < 0, \end{cases}$$

where t is time. (Typical values for α and β depend on detector type, for the NaI(Tl) detector α=0.07 and β=0.8 may be suitable, however for silicon drift diode (SDD) detectors α=0.02 and β=0.05 are suggested as providing a good theoretical pulse shape, but—being indicative of the pulse shape—α and β will vary according to pulse shape and hence from application to application.) Assuming α=0.02 and β=0.05, the function p(t) is continuous but not differentiable at t=0. It has a peak amplitude of approximately 0.3257, at $$t = \frac{\ln \alpha - \ln \beta}{\alpha - \beta} \approx 30.54.$$

The area under p(t) is $$\frac{1}{\alpha} - \frac{1}{\beta} = 30,$$

which is representative of the total energy deposited in the detector by the incident radiation.

The received signal is treated as being of the form:

$$s(t) = \sum_{i=0}^{\infty} a_i p(t - \tau_i) + \sigma w(t),$$

where w(t) represents additive white Gaussian noise with zero mean and unit variance. The variance of the noise σw(t) is therefore σ² (noting that w(t) is defined as having unit variance), and $a_i$ and $\tau_i$ represent the amplitude (with $a_i$>0) and time-shift of the ith pulse. (Without loss of generality, it is assumed that $\tau_i < \tau_j$ for i<j.)

The sequence $\{(a_i, \tau_i)\}_{i=0}^{\infty}$ is a compound Poisson process, and is generated in the following way. If there were a single source, with associated energy e and intensity λ, $\tau_i$ would have a Poisson distribution with intensity λ (or, equivalently, with inter-arrival times $\tau_{i+1} - \tau_i$ given by independent exponential distributions with mean $\lambda^{-1}$) and all the $a_i$ would be equal to cE for some calibration scalar c. If there are N sources, with the jth source having energy $E_j$ and intensity $\lambda_j$ associated with it, the actual sequence $\{(a_i, \tau_i)\}_{i=0}^{\infty}$ is what results from having a superposition of the individual sources. (In particular, $\tau_i$ would have a Poisson distribution with intensity $\sum_{j=1}^{N} \lambda_j$.)

Operating in the digital domain means that s(t) is only observed at integer values of t (It should be noted that the described function, comprising a difference of exponentials, is suitable for the described detection process so should provide an accurate model of the pulse. However, it has been found that, in some like applications, owing to the bandwidth of analogue to digital conversion and other practical effects, the output of detector unit 14 appears to have a low frequency artefact, so is not as accurately modelled by this exponential model as might be desired or required in some applications. In such situations, signal processing unit 18 can include an optional low-pass filter, for filtering the data s(t) to reduce or remove this low frequency artefact before the signal is passed to processing unit 50. However, this may colour the noise and smooth out the canonical pulse, as filtering discards information. Hence, the results of the present embodiment without this optional low-pass filter should still be regarded as "best possible". An alternative method of addressing the problem of the low frequency artefact is to fit to the data a function that takes the low frequency artefact into account, rather than removing the low frequency artefact with a low-pass filter.)

According to this embodiment, the sequence $\{(\alpha_i, \tau_i)\}_{i=0}^{\infty}$ is generally assumed to be deterministic but unknown. In some scenarios, it is expected that better performance can be achieved by taking into account the fact that the sequence $\{(\alpha_i, \tau_i)\}_{i=0}^{\infty}$ is a compound Poisson process.

The canonical pulse p(t) has the useful feature that any portion of it to the right of the origin (that is, for t≥0) can be written as a linear combination of $e^{-\alpha t}$ and $e^{-\beta t}$, and indeed $e^{-\alpha(t-t_0)} - e^{\beta(t-t_0)} = e^{\alpha t_0}e^{-\alpha t} - e^{\beta t_0}e^{-\beta t}$. Therefore, it is not necessary to know where the start of the pulse is in order to fit a pulse to a portion of data.

The curve $f(t) = ae^{-\alpha t} - be^{-\beta t}$ has its peak (either maximum or minimum) at time $$t_*(a, b) = \frac{\ln\alpha - \ln\beta}{\alpha - \beta} + \frac{\ln a - \ln b}{\alpha - \beta}$$

The start of the pulse (that is, when $f(t)=0$) occurs at time $$\frac{\ln a - \ln b}{\alpha - \beta}.$$

Thus, processor unit 50 comprises a processor 54 that includes a Least Squares Fitter 56 that fits the curve $f(t)$ to this data corrupted by additive white Gaussian noise, to obtain a least-squares fit; this is also the maximum likelihood estimate. It is efficient to implement in practice because it can be expressed as seeking the minimum of the Euclidean norm $\|y-Fx\|$ where y is the observation vector, x is the 2×1 vector corresponding to the coefficients a and b above, and F is a matrix with two columns, with entries $F_{i,1} = e^{-\alpha(i-1)}$ and $F_{i,2} = -e^{-\beta(i-1)}$, where i=1, . . . , n. The number of rows, n, in F is referred to as the "window size", and processor 54 includes a Window Size Setter 58 that is operable to set n and hence the size of the window employed by Least Squares Fitter 56. Processor 54 also includes a Peak Determiner 60 that determines the location of the peak $t_*(a,b)$ of the pulse, and an Amplitude Determiner 62 that determines the pulse amplitude, by evaluating $f(t)$ at $t=t_*(a, b)$.

The following were observed in the course of investigations into this approach by the present inventor (as discussed in greater detail below):

The longer the window size used, the more accurate the resulting estimate.

The relationship between the mean-square error and the window length has an asymptote; there is essentially no benefit to be gained in having a window size that exceeds the pulse length (hence, in the embodiment of FIG. 1—with its particular detector and values of α and β—there is little if any value in exceeding a window size of n=197).

(By comparison, other, experimental tests of the method of this embodiment found that, for a pulse length of 400 samples, a window size of 32 samples provided adequate results.)

The location of the peak is very sensitive to noise.

The amplitude of the peak is considerably less sensitive to noise.

The estimate of the location of the peak rapidly loses accuracy as the offset between the start of the window and the start of the pulse increases.

For short window lengths, an estimate of the peak amplitude is best made when the centre of the window corresponds approximately with the centre of the pulse.

The estimates of the location and amplitude of the peak have negligible bias. That is, the estimates are distributed equally on either side of the true value, so the apparatus may be regarded as an essentially unbiased estimator (as that term is understood in the art).

Thus, this approach for estimating the position of a single pulse in a data stream was tested by application to a simulated data set corrupted by additive white Gaussian noise, at five different window sizes (12, 25, 50, 100 and 197). The simulated data set was obtained by constructing a model of the detector data stream with a pulse shape described by the aforementioned values of α and β. Being a constructed model, pulse position and pulse amplitude were known. Estimates were made of times of arrival and amplitudes of pulses in the dataset with the pulse location method of this embodiment; these estimates were compared with the known values, and a distribution of the error was produced FIGS. 3A and 3B show the standard deviation (obtained from this simulation) of the error of the pulse location (corresponding to time of arrival) and of the pulse amplitude (corresponding to energy), respectively, with these five different window sizes, based on this comparison of the estimates and the known values. Each window starts at time t=0. The horizontal axis is the start time of the pulse, and the standard deviation of the noise is 0.1. The amplitude of the peak of the pulse is 1. (It should be noted that, for short windows, significantly better performance could have been obtained for estimating the amplitude of the peak had the location of the window been shifted so it was centred about the peak.)

Figures 4A, 4B:
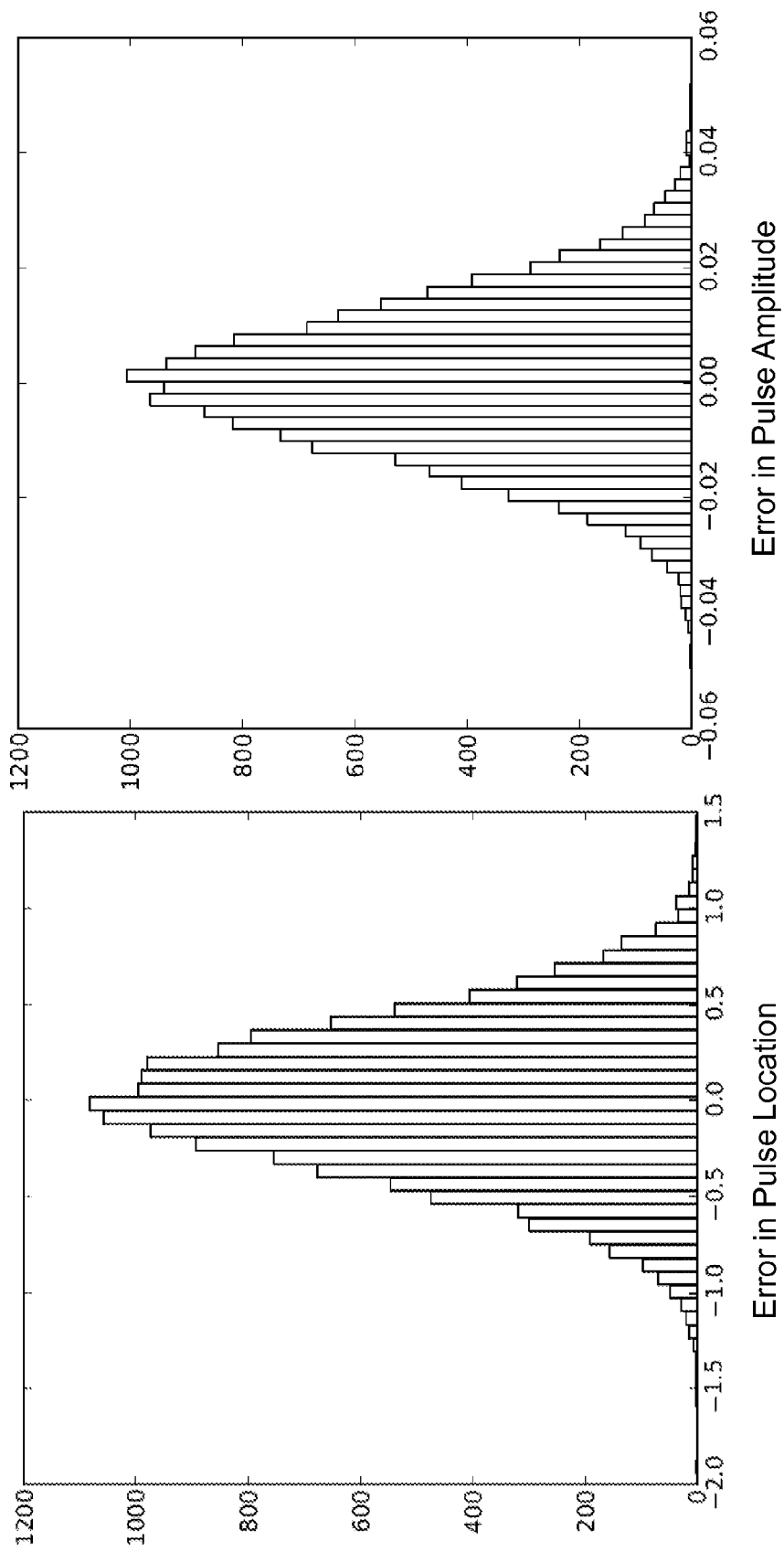
FIGS. 4A and 4B are histograms of the distribution (obtained via simulation) of the error in the pulse location and in the pulse amplitude, respectively, obtained using a window starting at the same time the pulse starts and having a size of 197, with a standard deviation of the noise of σ=0.1 and a pulse peak amplitude of 1.
Figures 5A, 5B:
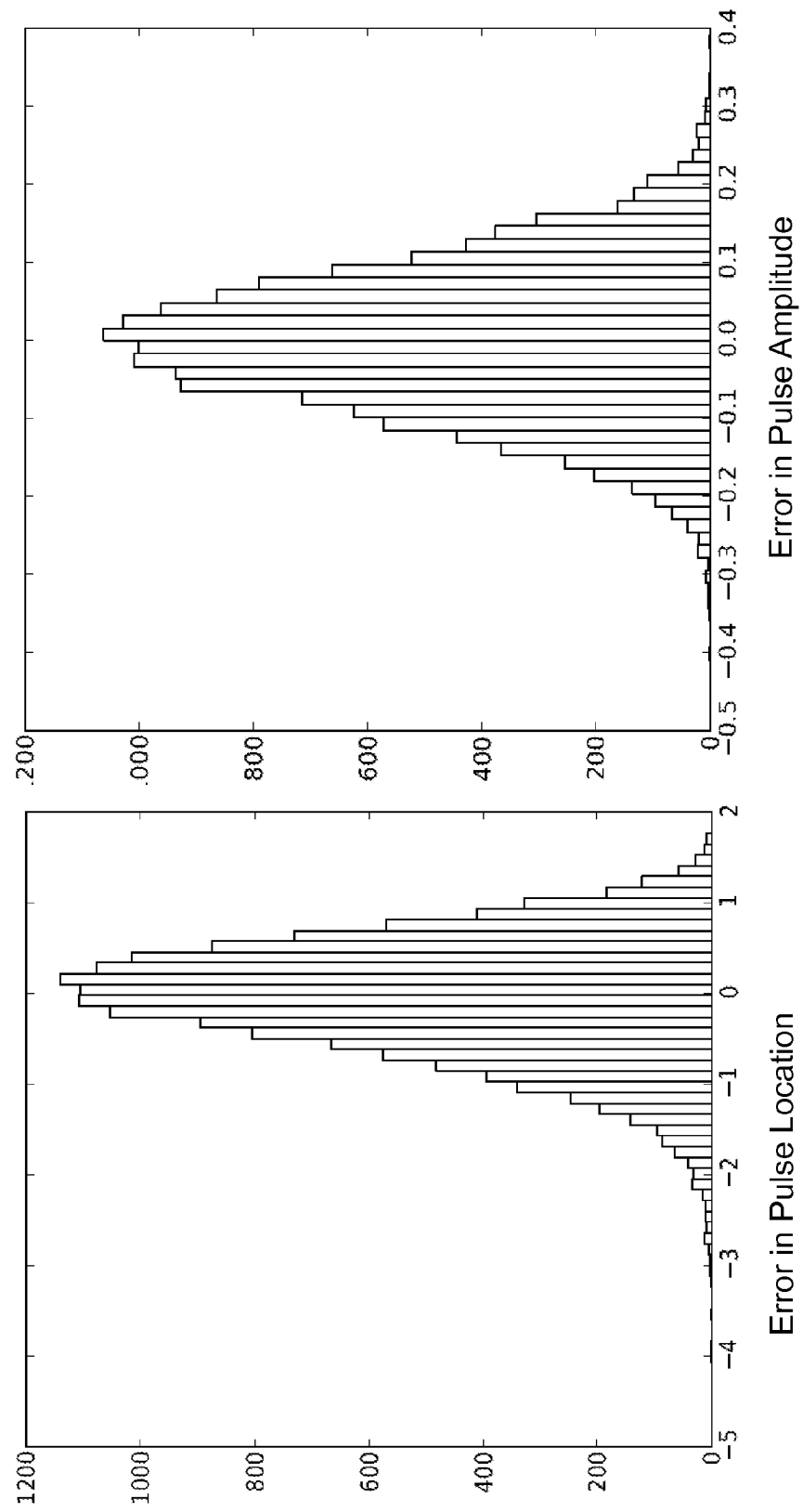
FIGS. 5A and 5B are histograms of the distribution (obtained via simulation) of the error in the pulse location and in the pulse amplitude, respectively, obtained using a window starting at the same time the pulse starts and having a size of 12, with a standard deviation of the noise of σ=0.1 and a pulse peak amplitude of 1.

FIGS. 4A and 4B are histograms of Error in Pulse Location and Error in Pulse Amplitude, respectively, as determined over 1000 simulations with window size n=197, and give an indication of the performance that can be expected if curve fitting is used. Note that the amplitude can be estimated with considerable more accuracy than the location of the pulse.

It may be noted that the estimate of the location of the pulse (or, essentially equivalently, the location of the peak of the pulse) can be improved (at the expense of introducing bias) by configuring Peak Determiner 60 to truncate any positive estimates of pulse location to zero (and hence, in effect, assuming that the pulse must have started before the start of the window, not somewhere after the start of the window). This is equivalent to performing a least-squares fit subject to the constraint that the coefficients a and b are both non-negative and a≥b, in other words, that the fitted curve is everywhere non-negative. This may also improve the performance of Amplitude Determiner 62.

Pulse Detection

According to this embodiment, processor 54 includes a Pulse Detector 64 for detecting the presence of a pulse. Although any suitable technique for performing this action may be employed, according to various versions of the present embodiment Pulse Detector 64 implements any one of the following techniques, which have been found to be advantageous.

The first such technique involves looking for a pulse that is 'self-consistent'; it gives reasonable results and can detect a pulse 'on the fly' or in real-time, without requiring the whole segment of data or data set to be available at the commencement of the application of the technique.

According to this first technique for pulse detection, Pulse Detector 64 uses Window Size Setter 58 to set a window size of n=197, then 'slides' that window across the data. At each window location, Pulse Detector 64 uses Least Squares Fitter 56 to fit a curve to each window of data (as described above), and then uses Peak Determiner 60 and Amplitude Determiner 62 to determine the location and size of the pulse in that respective window. Hence, in this example a curve is fitted to channels 1 to 197, to channels 2 to 198, to channels 3 to 199, etc.

The fit is deemed good, and Pulse Detector 64 outputs a flag indicating that a pulse has been found (along with the parameters of that pulse) to a Pulse Database 66 of processor 54, if:
1. the start of the pulse is found to have occurred before the start of the respective window;
2. the start of the pulse is found to have occurred no more than three samples or channels before the start of the window; and
3. the amplitude of the pulse (i.e. that of the pulse's peak) exceeds the standard deviation of the noise.

The rationale for these criteria is as follows. Using a window of length larger than the pulse length would not lead to any appreciable improvement. (It is expected that, in some applications, a shorter or much shorter window will suffice for satisfactory pulse detection.) If the window starts before the pulse does, then the fit is not consistent in the sense that the fit assumes that all points in the window belong to the positive part of the pulse. The location estimate is relatively inaccurate unless the start of the window and the start of the pulse are near to each other, hence the second requirement. The third requirement arises because low-amplitude pulses sometimes can be fit to pure noise signals.

If in possession of a segment of data that is known to contain a pulse, Pulse Detector 64 may employ a second technique. This involves finding, for each k in the segment of data, the coefficients $c_k$ and $\tau_k$ with $k-1 \leq \tau_k \leq k$ and $c_k \geq 0$, making $c_k p(t-\tau_k)$ the best (in the least-squares sense) fit to the data in the window from k to the end of the data segment, then computing the real number $\tau_k$, the residual, being the sum of the squares of the differences between the data and $c_k p(t-k)$ at each sample point in the segment of data (and not just for the samples in the window). The "best" curve is $c_k p(t-\tau_k)$ where k is the minimiser of $\tau_k$.

The pulse is non-negative, so Pulse Detector 64 can alternatively detect a pulse—according to a third technique—by looking for a change in the mean of the signal. For example, one implementation that is expected to be fast (in at least some applications) involves looking for a run of samples, most of which exceed some threshold (for example, ten samples in a row that are strictly positive). "Most" in this context can be selected according to what, in a particular application, is regarded as sufficiently significant to flag the presence of a pulse, and might be—for example—80%, 85%, 90%, 95% or 100% of the run of samples.

The Gaussian noise assumption means that the probabilities of false detection and missed detection can be computed readily.

More generally, according to this third technique, when a curve fitted to a segment (or window) of data and the error in this fit is computed, three general cases may arise:
1) There is no signal apart from the baseline of the detector, that is, the output contains no events. When the curve is fitted, the error is minimal; this error is a function of both system noise and baseline offset, so will be substantially constant in cases where no pulses are present;
2) The rising edge of a signal appears in the first few channels of the window, so the curve is sharp at the start (and theoretically not differentiable at t=0). Consequently it is very difficult to fit the model to the window of data, as the data is mostly flat (viz. baseline) with the start of the pulse at the end of the window. It should be noted that the pulse detector is operating on the error in the pulse fit so, as the pulse moves into the window, the error increases. The 10 samples that are strictly positive suggest an error in the fit and therefore in the arrival of a pulse.
3) The rising edge of the pulse has passed through the window and now the window just contains segments of the pulse (provided that a window length is employed that is less than the pulse length). The exponential model described above now fits the data well again and the error signal returns to its quiescent state.

If the location of the pulse is required, Pulse Detector 64 may implement the first technique with the additional step of comparing the residual of the found fit with the residual of fitting a curve starting a sample earlier than determined by Pulse Detector 64. The curve with the smaller residual is deemed the better fit so subsequently used by Pulse Detector 64 to estimate the location of the peak.

If only the amplitude of the peak is required, however, the above techniques can be implemented in Pulse Detector 64 unmodified. Indeed, for large window sizes the estimate of the amplitude is relatively insensitive to the offset between the start of the pulse and the start of the window, so there is no reason to add the extra step of endeavouring to determine if the pulse started a sample earlier than predicted by the above-described first pulse identification technique.

The second technique described above can be implemented efficiently by exploiting the structure of the problem, but it requires the whole segment of data to be provided. It could be modified (with a possible loss in performance) to work 'on the run' by using a fixed window length (for example, the pulse length or less) for curve fitting and setting a residual threshold indicative of when the residual is deemed small enough for a pulse to have been found.

Two Pulses

In order to gain a feel for what is possible, assume it is somehow known which samples correspond to the first pulse and which correspond to both pulses. Let T denote the number of samples belonging purely to pulse one. It can be shown that fitting two pulses to the data in the least-squares sense, actually decomposes into fitting one curve $f(t)$ to the T samples belonging only to pulse one, and fitting another curve $f(t)$ to the samples belonging to both pulses. From the single pulse case described above, it is known that if T is small then the estimation accuracy is poor. This represents a fundamental limitation in separating two closely spaced pulses.

FIGS. 5A, 5B, 6A and 6B illustrate the performance that can be expected from estimating the parameters of the first pulse from 12 and 25 samples respectively. Note though that errors in estimating the parameters of the first pulse will adversely affect the estimates of the parameters of the second pulse because the parameters of the second pulse must be found by "subtracting" the parameters of the first pulse from the parameters of the sum of two pulses.

Detecting the Start of a Pulse Using a Short Window

According to the present embodiment the following approach for detecting the start of a new pulse using a short length of data is employed. It was tested for the case of finding the start of a signal pulse in white noise, in which case, the method involved sliding a short window (such as with a length of ten samples) across the data and performing a constrained fit on the data under the window. The constraint was that the amplitude of the pulse should be positive and the start time of the pulse be between −1 and 0 relative to the start of the window. The sum of the squared errors of this fit was divided into the sum of the squares of the data points under the window. A large value indicates that the curve fits the data well compared with assuming the data were purely white noise.

Figure 7A:
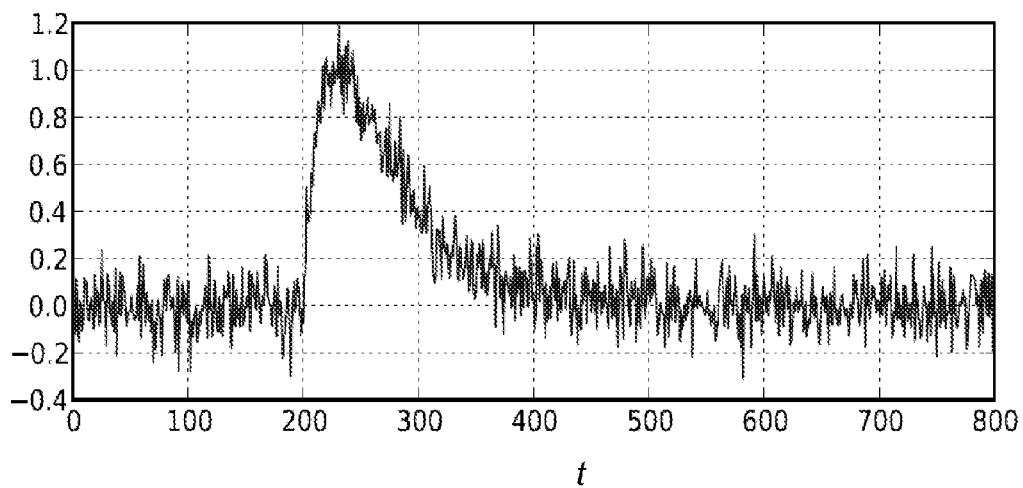
FIGS. 7A and 7B are plots, respectively, of σ=0.1, of a pulse of amplitude 1, starting at 200, and a corresponding plot of the ratio of residues (with a window size of 10) determined according to this embodiment of the present invention.
Figure 7B:
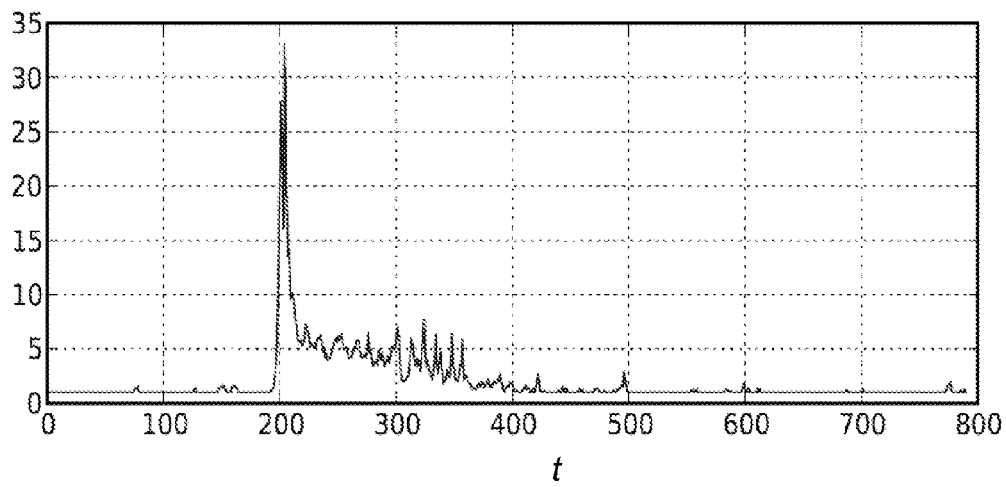
Figure 8A:
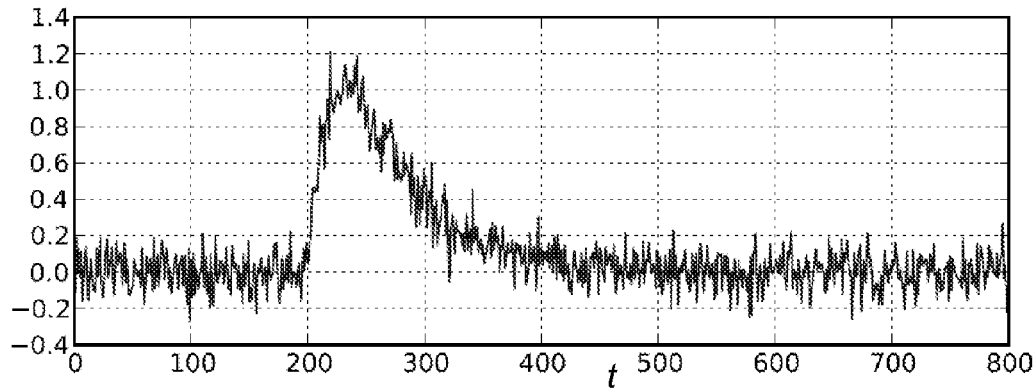
FIGS. 8A and 8B are plots, respectively, of σ=0.1, of a pulse of amplitude 1, starting at 200, and a corresponding plot of the ratio of residues (with a window size of 10) determined according to this embodiment of the present invention.
Figure 8B:
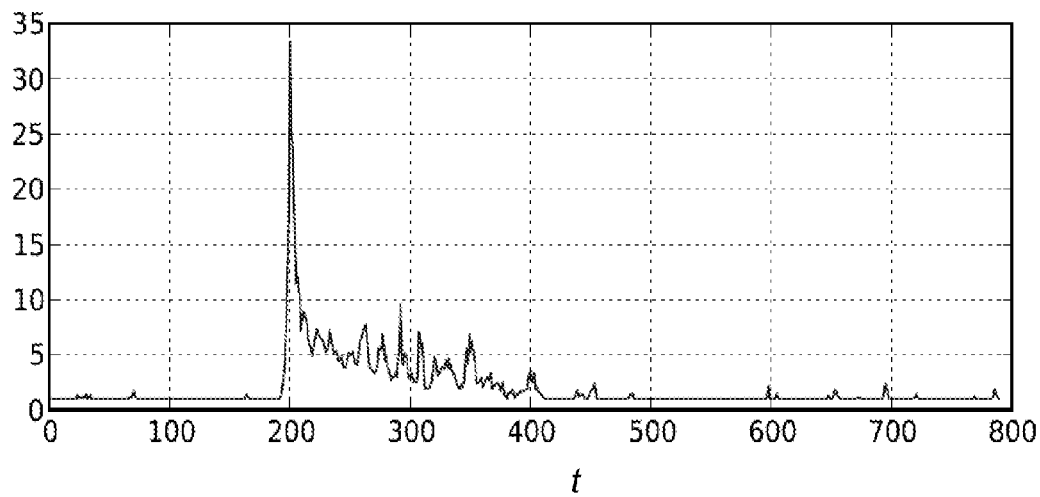
Figure 9A:
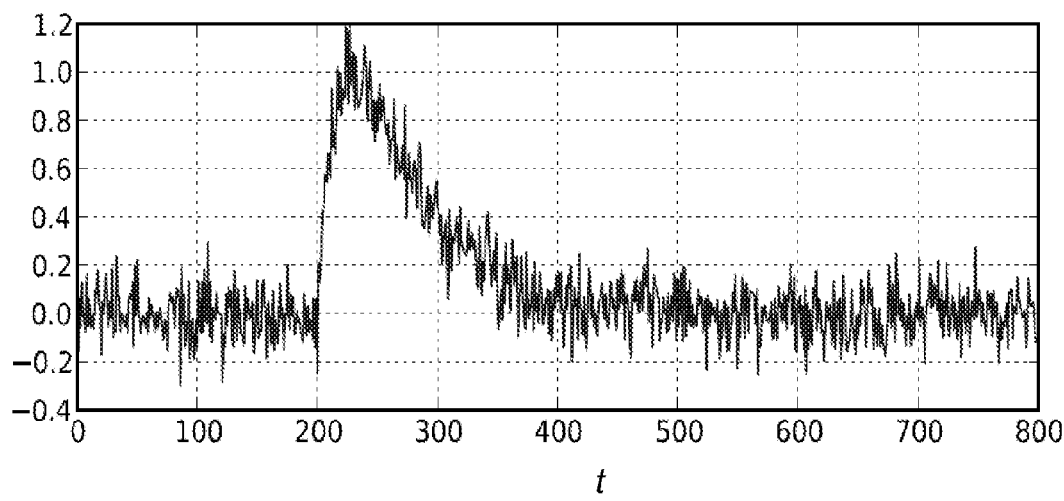
FIGS. 9A and 9B are plots, respectively, of σ=0.1, of a pulse of amplitude 1, starting at 200, and a corresponding plot of the ratio of residues (with a window size of 20) determined according to this embodiment of the present invention.
Figure 9B:
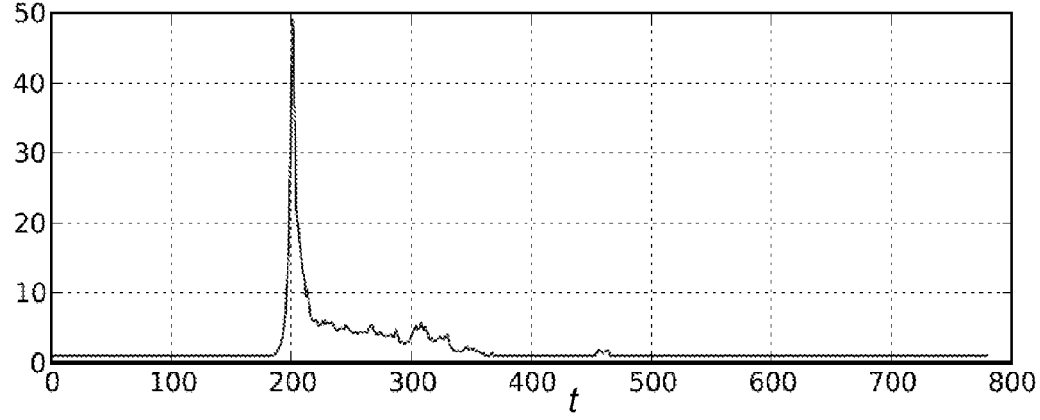
Figure 10A:
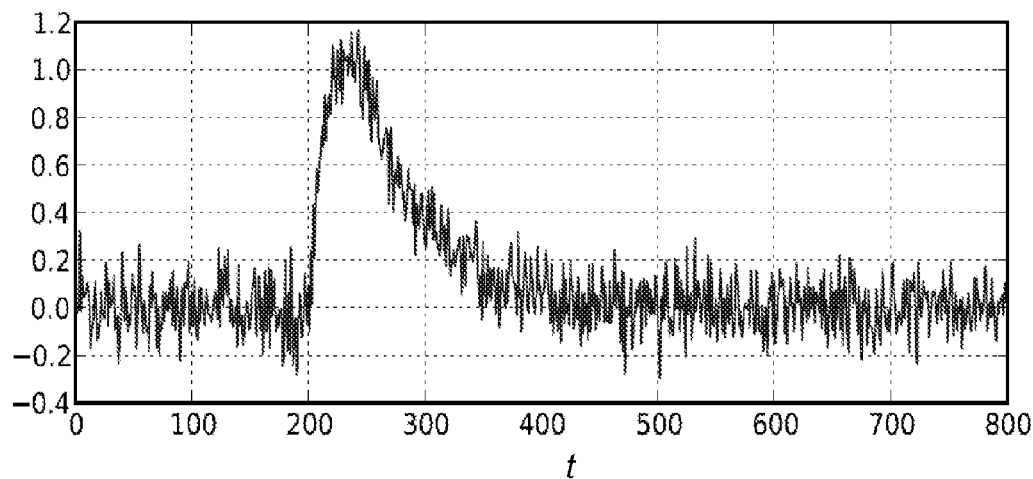
FIGS. 10A and 10B are plots, respectively, of σ=0.1, of a pulse of amplitude 1, starting at 200, and a corresponding plot of the ratio of residues (with a window size of 50) determined according to this embodiment of the present invention.
Figure 10B:
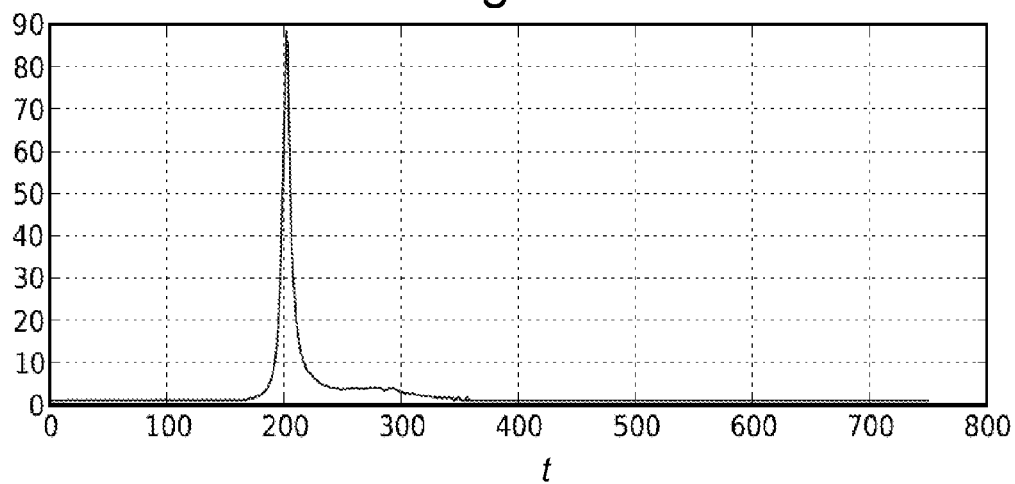
Figure 11A:
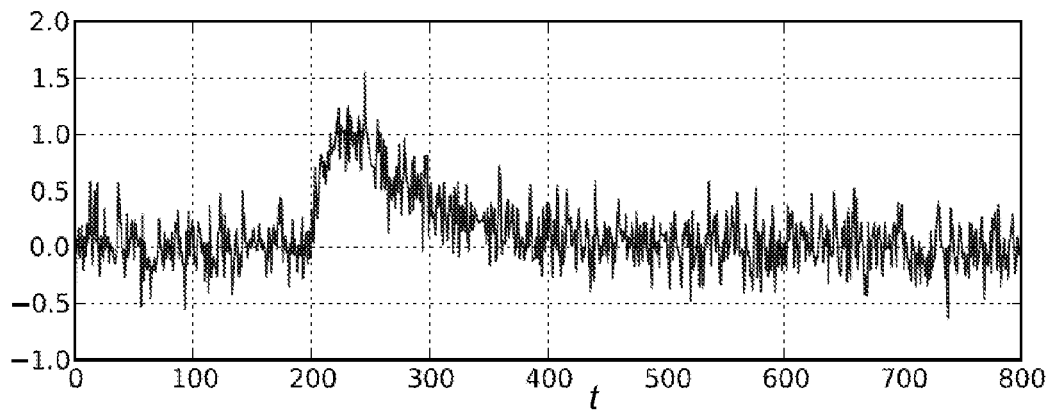
FIGS. 11A and 11B are plots, respectively, of σ=0.2, of a pulse of amplitude 1, starting at 200, and a corresponding plot of the ratio of residues (with a window size of 10) determined according to this embodiment of the present invention.
Figure 11B:
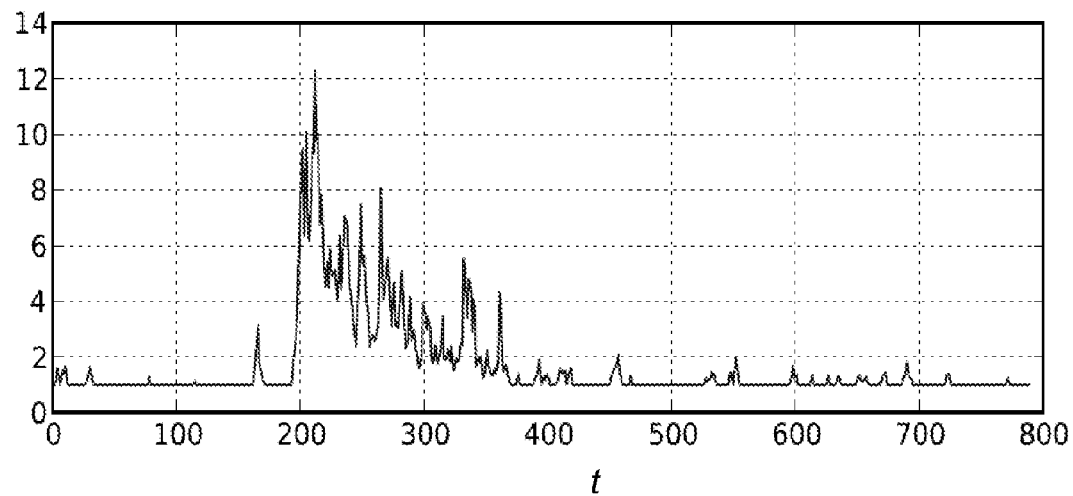
Figure 12A:
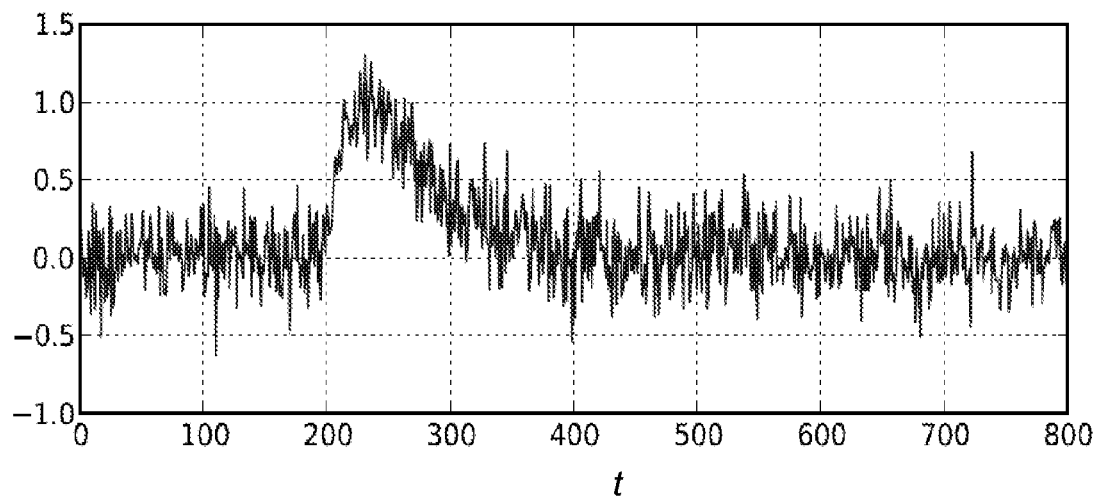
FIGS. 12A and 12B are plots, respectively, of σ=0.2, of a pulse of amplitude 1, starting at 200, and a corresponding plot of the ratio of residues (with a window size of 20) determined according to this embodiment of the present invention.
Figure 12B:
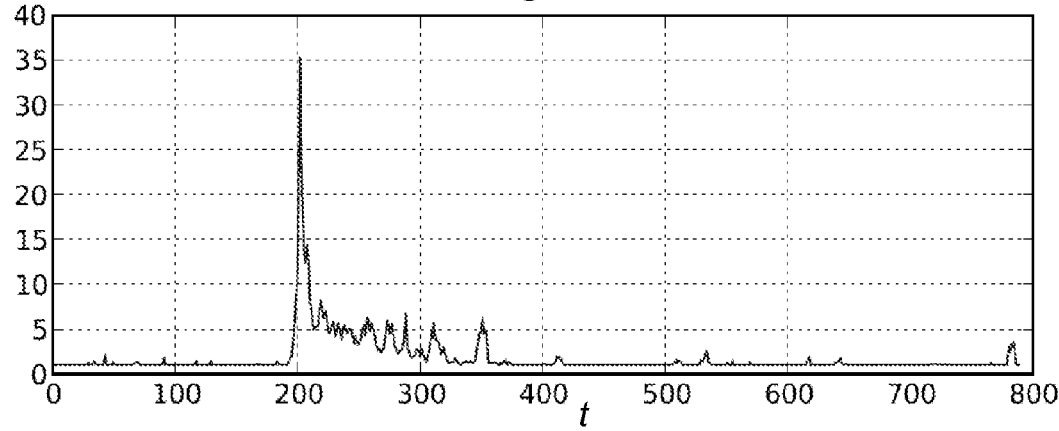
Figure 13A:
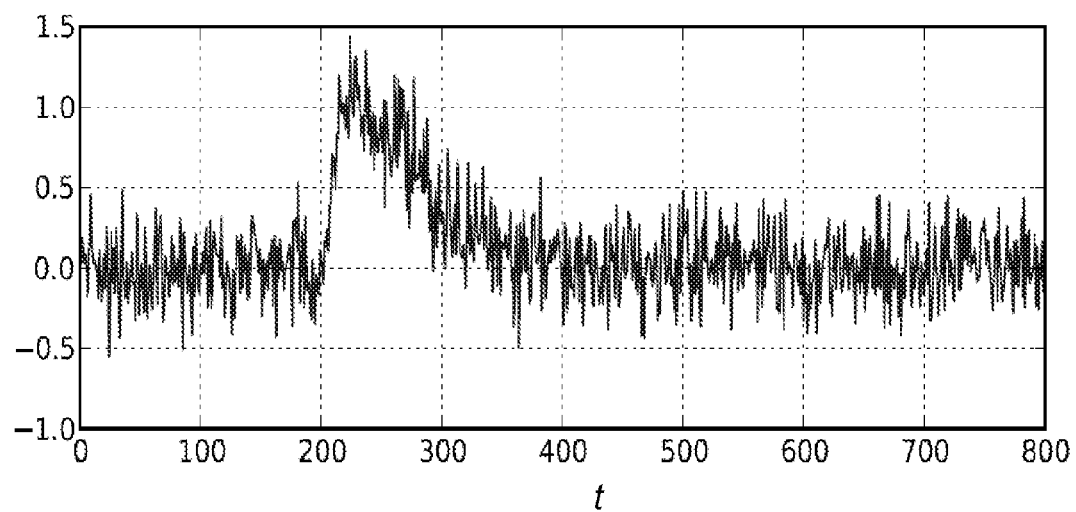
FIGS. 13A and 13B are plots, respectively, of σ=0.2, of a pulse of amplitude 1, starting at 200, and a corresponding plot of the ratio of residues (with a window size of 50) determined according to this embodiment of the present invention.
Figure 13B:
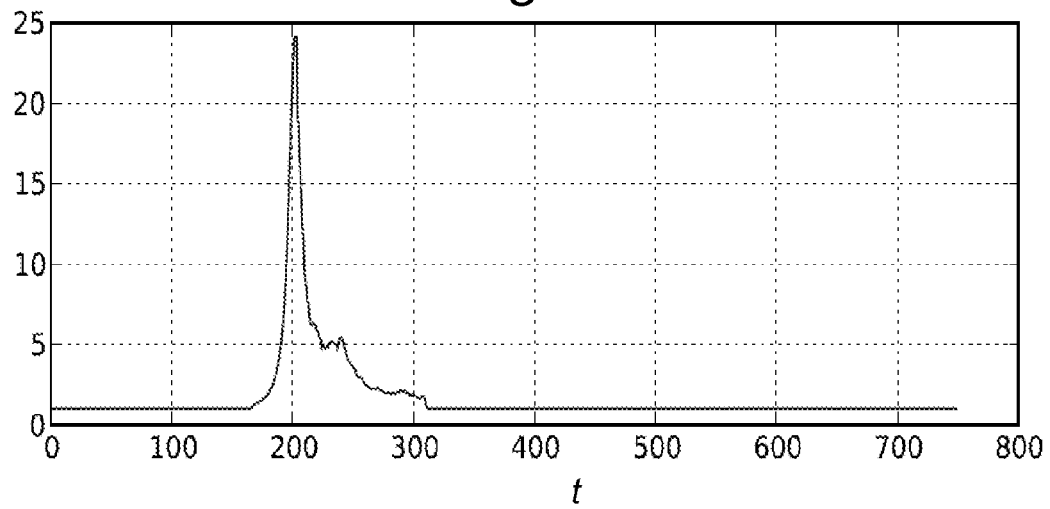

FIGS. 7A to 13B illustrate the effectiveness of this approach. FIGS. 7A, 8A, 9A, 10A, 11A, 12A and 13A are plots of the respective pulses (all with a pulse amplitude of 1 and starting at 200), while FIGS. 7B, 8B, 9B, 10B, 11B, 12B and 13B are—respectively—corresponding plots of the ratio of residues (with various window sizes) as follows:

|                    | σ   | window size |
|--------------------|-----|-------------|
| FIGS. 7A and 7B    | 0.1 | 10          |
| FIGS. 8A and 8B    | 0.1 | 10          |
| FIGS. 9A and 9B    | 0.1 | 20          |
| FIGS. 10A and 10B  | 0.1 | 50          |
| FIGS. 11A and 11B  | 0.2 | 10          |
| FIGS. 12A and 12B  | 0.2 | 20          |
| FIGS. 13A and 13B  | 0.2 | 50          |

The estimated location of the peak in each case does not indicate the precise start time of the pulse; rather, it indicates that the start of the pulse is within a few samples of its peak. Nonetheless, these examples of the application of the method (of comparing the goodness-of-fit of a straight line (i.e. no pulse) to the data versus fitting the start of a pulse to the data) shows its efficacy in detecting the start of a pulse in white noise.

To rule out false fits to noise, a test is applied to see whether the fitted pulse has a peak amplitude that exceeds the stated deviation σ of the noise. (Optionally, this could be ensured by constraining the fitted curve further to enforce an amplitude of at least σ.)

Finding the start of a new pulse in general involves sliding two back-to-back windows (of length, say, ten) across the data. The first window is used to estimate the superposition of all previous pulses (facilitated by the fact that plural pulses can still be represented by a linear combination of just two exponentials). In a simple implementation of this approach, this estimate can be used to subtract the contributions of the previous pulses from the data under the second window. The approach then reduces to the one considered above of estimating the start of a pulse in white noise.

In a more complex implementation, subject to using only the data under the two windows, a curve of the form $c_1 p(t-\tau_1) + c_2 p(t-\tau_2)$ is fitted to the data, subject to $\tau_1$ being less than or equal to the start of the first window, $\tau_2$ being between −1 and 0 of the start of the second window, and $c_1$ and $c_2$ being positive. (This can be implemented efficiently because the constraint set is a convex polytope and the cost function is a quadratic function in four dimensions.)

Optionally, the method may include searching for the best possible fit in terms of minimizing the mean-square error over the full length of the data. In general, this would require searching over all possible ways of assigning data points to pulses but, if the aforementioned pulse detection method is used to narrow down the region in which to look, this becomes a way of refining the estimates.

Other Methods

A plethora of heuristic methods could be employed. Several are now touched on briefly.

One approach would be to assume there is single pulse, determine the best possible fit for a single pulse, then compute one or more measures of goodness of fit (see below) to determine if this is an acceptable fit or not. (This differs from the optimal method in that the goodness of fit is not being compared with that of fitting two pulses, but rather, it is merely being assessed in term of whether or not the residuals look like white noise.)

Another approach might be to fit a single pulse to a short window of data and determine its goodness of fit (see below). A bad fit would indicate that perhaps the start of a second pulse occurred somewhere within the window, therefore accounting for the bad fit.

Potential measures of fitness based on the residuals, that is, the difference between the fitted curve and the actual data, include:

sum of absolutes;
sum of squares (second order moments);
distribution of positive and negative values;
sum of cubes (third order moments);
maximum and minimum values.

Looking for a bad fit should be done by computing such measures over window sizes which are not too small and not too large. Over very small windows, it will be difficult to say with certainty that noise could not explain for the discrepancies. Over very large windows, a poor fit in a crucial part of the data might be lost in the average goodness of fit over the whole window.

The motivation for the above measures of goodness of fit is that fitting a single curve when there are two will result in a run of values where the data is either below the curve or above the curve. This difference can be picked up by looking at odd-ordered moments, or looking at the maximum and minimum values of the errors, for example.

Single Pulse in Noise

The apparatus of FIG. 1 can be varied—in particular in the method implemented by the modules of processor 54—to identify a single pulse in additive white Gaussian noise according to a variation of this embodiment, To exemplify this variation, the following round of trials were conducted with a data set of 500 samples (representing time from 0 to 499). The data were obtained by generating a pulse starting at time 49.5, having unit amplitude, and adding to that pulse white Gaussian noise having a standard deviation denoted by σ. (A second round of trials was conducted with the pulse starting at 50.0.)

The method of this variation searches for the fit that minimises the sum of the squares of the error residual. For each integer k between 0 and 498, the pulse that minimizes the sum of the square of the error residual, and starts somewhere between k−1 and k is determined (the pulse that minimises the mean-square error being deemed the correct one), subject to the additional constraint that the pulse has a non-negative amplitude. The residual error of fit over the full 500 samples is then calculated, from which the mean-square error of fit can be obtained. The pulse which minimises the mean-square error is deemed to be the correct one; the starting time and amplitude of this best pulse are computed and compared with the true starting time (either 49.5 or 50) and the true amplitude (which is unity).

Ten thousand iterations were performed. The following results were obtained for the pulse located at time 49.5.

TABLE 1

| σ | Average Error | | Standard Deviation | | 99.9% Quantile | |
|---|---|---|---|---|---|---|
| | Time | Amplitude | Time | Amplitude | Time | Amplitude |
| 0.001 | 0.0000 | 0.0000 | 0.0040 | 0.0001 | 0.0130 | 0.0004 |
| 0.002 | 0.0001 | 0.0000 | 0.0081 | 0.0003 | 0.0261 | 0.0008 |
| 0.005 | 0.0002 | 0.0000 | 0.0202 | 0.0006 | 0.0652 | 0.0021 |
| 0.010 | 0.0004 | 0.0000 | 0.0403 | 0.0013 | 0.1308 | 0.0042 |
| 0.020 | 0.0007 | 0.0000 | 0.0807 | 0.0026 | 0.2625 | 0.0085 |
| 0.030 | 0.0009 | 0.0000 | 0.1210 | 0.0039 | 0.3916 | 0.0127 |
| 0.040 | 0.0010 | 0.0000 | 0.1614 | 0.0052 | 0.5229 | 0.0169 |
| 0.050 | 0.0009 | 0.0000 | 0.2028 | 0.0065 | 0.6645 | 0.0212 |
| 0.060 | 0.0007 | 0.0000 | 0.2451 | 0.0078 | 0.7781 | 0.0254 |
| 0.070 | 0.0008 | 0.0001 | 0.2880 | 0.0091 | 0.9129 | 0.0296 |
| 0.080 | 0.0005 | 0.0001 | 0.3305 | 0.0104 | 1.0390 | 0.0339 |
| 0.090 | 0.0008 | 0.0001 | 0.3732 | 0.0116 | 1.1655 | 0.0381 |
| 0.100 | 0.0012 | 0.0001 | 0.4154 | 0.0129 | 1.2926 | 0.0424 |
| 0.200 | 0.0037 | 0.0004 | 0.8484 | 0.0259 | 2.9381 | 0.0847 |

Below are the corresponding results for when the pulse was located at time 50.0.

TABLE 2

| σ | Average Error | | Standard Deviation | | 99.9% Quantile | |
|---|---|---|---|---|---|---|
| | Time | Amplitude | Time | Amplitude | Time | Amplitude |
| 0.001 | 0.0002 | 0.0000 | 0.0040 | 0.0001 | 0.0126 | 0.0004 |
| 0.002 | 0.0003 | 0.0000 | 0.0081 | 0.0003 | 0.0252 | 0.0008 |
| 0.005 | 0.0008 | 0.0000 | 0.0201 | 0.0006 | 0.0630 | 0.0021 |
| 0.010 | 0.0015 | 0.0000 | 0.0402 | 0.0013 | 0.1261 | 0.0042 |
| 0.020 | 0.0029 | 0.0000 | 0.0804 | 0.0026 | 0.2528 | 0.0084 |
| 0.030 | 0.0041 | 0.0000 | 0.1206 | 0.0039 | 0.3801 | 0.0127 |
| 0.040 | 0.0053 | 0.0000 | 0.1608 | 0.0052 | 0.5073 | 0.0169 |
| 0.050 | 0.0064 | 0.0000 | 0.2009 | 0.0065 | 0.6315 | 0.0211 |
| 0.060 | 0.0073 | 0.0000 | 0.2411 | 0.0078 | 0.7558 | 0.0254 |
| 0.070 | 0.0081 | 0.0001 | 0.2814 | 0.0091 | 0.8874 | 0.0296 |
| 0.080 | 0.0089 | 0.0001 | 0.3319 | 0.0103 | 1.0637 | 0.0338 |
| 0.090 | 0.0097 | 0.0001 | 0.3630 | 0.0116 | 1.1968 | 0.0380 |
| 0.100 | 0.0101 | 0.0001 | 0.4047 | 0.0129 | 1.3261 | 0.0423 |
| 0.200 | 0.0134 | 0.0004 | 0.8377 | 0.0259 | 2.7706 | 0.0846 |

The average error, which is computed without taking absolute value, is an indication of bias.

Perhaps due to the constraints on the pulse which were imposed, it appears that there is a small positive bias at high noise levels.

Encouragingly, the performance appears to be insensitive to whether or not the pulse starts on a sample or between samples; the two tables are in close agreement.

Single Pulse Riding on the Back of Another Pulse

One may also consider the problem of estimating a pulse of interest given that it is riding on the back of a previous pulse, that is, two pulses are present and it is desired to estimate the location and amplitude of the second pulse. The noise is additive white Gaussian noise with a standard deviation denoted by σ. Both pulses had a peak amplitude of unity.

When fitting two pulses according to the method of this embodiment, the effect of the previous pulse on the current one should be considered. In this approach, if considering a sample point k, a rearward window k−10 to k−1 (assuming a window length of 10 is employed) and a forward window k to k+10 are used. A curve is fitted to the rear section of data to remove the effect of previous pulses on the estimation of the next pulse. The method searches in the range of k from 10 to 60 for a pulse starting at a time somewhere between k−1 and k. Precisely two pulses are fitted to the data, the first pulse being fitted to samples 0 to k−1, then the combination of the first plus the second pulse is fitted to samples k to 500. The first pulse is constrained to have a non-negative amplitude and a starting time less than or equal to 0. The second pulse is constrained to have a non-negative amplitude and a starting time between k−1 and k. For each k, the mean-square error of the residual to the fit is computed. The pulse having the smallest mean-square error is deemed to be the correct fit, as described above.

In each case, 10,000 simulations were performed. The tables below report the errors in the same way as previously. Table 3 contains the results of a trial in which the previous pulse started at time 0 and the pulse of interest stared at time 10.

TABLE 3

| σ | Average Error | | Standard Deviation | | 99.9% Quantile | |
|---|---|---|---|---|---|---|
| | Time | Amplitude | Time | Amplitude | Time | Amplitude |
| 0.001 | −0.0012 | 0.0004 | 0.0071 | 0.0009 | 0.0241 | 0.0035 |
| 0.005 | −0.0061 | 0.0020 | 0.0355 | 0.0045 | 0.1195 | 0.0177 |
| 0.010 | −0.0120 | 0.0039 | 0.0709 | 0.0091 | 0.2368 | 0.0353 |
| 0.050 | −0.0526 | 0.0197 | 0.3493 | 0.0455 | 1.2308 | 0.1745 |
| 0.080 | −0.0619 | 0.0301 | 0.5506 | 0.0716 | 1.9875 | 0.2602 |
| 0.100 | −0.0502 | 0.0354 | 0.6765 | 0.0875 | 2.6578 | 0.3121 |

Table 4 contains the results of a trial in which the previous pulse started at time −10 and the pulse of interest started at time 10. The reason why the performance is worse than the previous case is that it is harder to obtain an accurate estimate of the previous pulse using samples 10 to 19 as opposed to using samples 0 to 9.

TABLE 4

| σ | Average Error | | Standard Deviation | | 99.9% Quantile | |
|---|---|---|---|---|---|---|
| | Time | Amplitude | Time | Amplitude | Time | Amplitude |
| 0.001 | −0.0002 | 0.0001 | 0.0074 | 0.0011 | 0.0238 | 0.0037 |
| 0.005 | −0.0007 | 0.0003 | 0.0368 | 0.0056 | 0.1195 | 0.0186 |
| 0.010 | −0.0012 | 0.0007 | 0.0736 | 0.0113 | 0.2369 | 0.0371 |
| 0.050 | −0.0043 | 0.0033 | 0.3712 | 0.0565 | 1.3832 | 0.1827 |
| 0.080 | −0.0346 | 0.0036 | 0.6037 | 0.0898 | 2.5663 | 0.2806 |
| 0.100 | −0.0747 | 0.0023 | 0.7603 | 0.1105 | 3.6784 | 0.3444 |

Table 5 contains the results of a trial in which the previous pulse started at time 0 and the pulse of interest started at time 20.

TABLE 5

| σ | Average Error | | Standard Deviation | | 99.9% Quantile | |
|---|---|---|---|---|---|---|
| | Time | Amplitude | Time | Amplitude | Time | Amplitude |
| 0.001 | −0.0007 | 0.0001 | 0.0055 | 0.0004 | 0.0183 | 0.0014 |
| 0.005 | −0.0035 | 0.0007 | 0.0276 | 0.0019 | 0.0915 | 0.0069 |
| 0.010 | −0.0070 | 0.0013 | 0.0552 | 0.0037 | 0.1827 | 0.0139 |
| 0.050 | −0.0344 | 0.0066 | 0.2749 | 0.0188 | 0.9100 | 0.0738 |
| 0.080 | −0.0553 | 0.0108 | 0.4483 | 0.0303 | 1.6084 | 0.1211 |
| 0.100 | −0.0703 | 0.0137 | 0.5700 | 0.0383 | 2.1013 | 0.1529 |

Table 6 contains the results of a trial in which the previous pulse started at time 0 and the pulse of interest started at time 30.

TABLE 6

| σ | Average Error | | Standard Deviation | | 99.9% Quantile | |
|---|---|---|---|---|---|---|
|  | Time | Amplitude | Time | Amplitude | Time | Amplitude |
| 0.001 | −0.0005 | 0.0001 | 0.0049 | 0.0002 | 0.0153 | 0.0009 |
| 0.005 | −0.0024 | 0.0003 | 0.0246 | 0.0012 | 0.0761 | 0.0044 |
| 0.010 | −0.0048 | 0.0007 | 0.0492 | 0.0024 | 0.1523 | 0.0088 |
| 0.050 | −0.0245 | 0.0035 | 0.2454 | 0.0121 | 0.7617 | 0.0441 |
| 0.080 | −0.0405 | 0.0056 | 0.3957 | 0.0194 | 1.3801 | 0.0715 |
| 0.100 | −0.0516 | 0.0071 | 0.4997 | 0.0243 | 1.6938 | 0.0890 |

The performance is improving as the start of the main pulse is delayed because there are more samples available of the earlier pulse to allow for a better estimate of its parameters.

It may be noted that it appears that the error in estimating the amplitude in the last table (when there were 30 samples of the first pulse available) is approximately twice as large as estimating the amplitude of a single pulse (as given above).

Two Pulses in Noise

Two pulses are generated, both with unit amplitude. The first pulse starts at time 40 and the starting time of the second pulse may be 50, 60 or 70. The signal is corrupted by additive white Gaussian noise with standard deviation σ.

A search is conducted for the two pulses. Precisely, $k_1$ and $k_2$ are varied, with $k_1$ taking values between 36 and 45 and $k_2$ taking values between k−4 and k+5 where k is the start of the second pulses. The constraint that $k_2 - k_1 \geq 10$ is enforced. For each pair ($k_1$, $k_2$), the sum of two pulses are fitted to the data. Both pulses are constrained to have a non-negative amplitude. The ith pulse is constrained to start between $k_i - 1$ and $k_i$.

The results of 10,000 simulations are shown below, in a format analogous to the previous section, but with two tables instead of one, showing the errors of estimating the first and second pulses' characteristics respectively.

TABLE 7

Accuracy of estimating the first pulse; pulses were 10 samples apart

| σ | Average Error | | Standard Deviation | | 99.9% Quantile | |
|---|---|---|---|---|---|---|
|  | Time | Amplitude | Time | Amplitude | Time | Amplitude |
| 0.001 | 0.0002 | 0.0000 | 0.0076 | 0.0012 | 0.0255 | 0.0039 |
| 0.005 | 0.0007 | 0.0001 | 0.0377 | 0.0062 | 0.1275 | 0.0195 |
| 0.010 | 0.0009 | 0.0001 | 0.0752 | 0.0123 | 0.2496 | 0.0391 |
| 0.050 | −0.0156 | 0.0006 | 0.3835 | 0.0632 | 1.4974 | 0.2451 |
| 0.080 | −0.0626 | 0.0012 | 0.6794 | 0.1102 | 3.4074 | 0.4526 |
| 0.100 | −0.01164 | 0.0022 | 0.9143 | 0.1466 | 4.9049 | 0.5748 |

TABLE 8

Accuracy of estimating the second pulse; pulses were 10 samples apart

| σ | Average Error | | Standard Deviation | | 99.9% Quantile | |
|---|---|---|---|---|---|---|
|  | Time | Amplitude | Time | Amplitude | Time | Amplitude |
| 0.001 | 0.0001 | 0.0000 | 0.0075 | 0.0012 | 0.0247 | 0.0040 |
| 0.005 | 0.0004 | 0.0001 | 0.0375 | 0.0062 | 0.1234 | 0.0199 |
| 0.010 | 0.0010 | 0.0001 | 0.0750 | 0.0123 | 0.2443 | 0.0399 |
| 0.050 | 0.0180 | 0.0006 | 0.3866 | 0.0632 | 1.5679 | 0.2381 |
| 0.080 | 0.0548 | 0.0014 | 0.6751 | 0.1102 | 3.0245 | 0.4430 |
| 0.100 | 0.0948 | 0.0025 | 0.9074 | 0.1466 | 4.4879 | 0.5801 |

TABLE 9

Accuracy of estimating the first pulse; pulses were 20 samples apart

| σ | Average Error | | Standard Deviation | | 99.9% Quantile | |
|---|---|---|---|---|---|---|
|  | Time | Amplitude | Time | Amplitude | Time | Amplitude |
| 0.001 | 0.0002 | 0.0000 | 0.0057 | 0.0005 | 0.0187 | 0.0015 |
| 0.005 | 0.0009 | 0.0000 | 0.0286 | 0.0023 | 0.0930 | 0.0073 |
| 0.010 | 0.0016 | 0.0000 | 0.0572 | 0.0045 | 0.1856 | 0.0146 |
| 0.050 | 0.0023 | 0.0001 | 0.2865 | 0.0228 | 1.0749 | 0.0731 |
| 0.080 | −0.0034 | 0.0002 | 0.4703 | 0.0372 | 1.6868 | 0.1322 |
| 0.100 | −0.0089 | 0.0005 | 0.6037 | 0.0475 | 2.3041 | 0.1628 |

TABLE 10

Accuracy of estimating the second pulse; pulses were 20 samples apart

| σ | Average Error | | Standard Deviation | | 99.9% Quantile | |
|---|---|---|---|---|---|---|
|  | Time | Amplitude | Time | Amplitude | Time | Amplitude |
| 0.001 | 0.0002 | −0.0000 | 0.0057 | 0.0005 | 0.0189 | 0.0015 |
| 0.005 | 0.0009 | −0.0000 | 0.0287 | 0.0023 | 0.0948 | 0.0073 |
| 0.010 | 0.0018 | −0.0000 | 0.0574 | 0.0045 | 0.1897 | 0.0146 |
| 0.050 | 0.0101 | −0.0002 | 0.2875 | 0.0227 | 0.9699 | 0.0758 |
| 0.080 | 0.0183 | −0.0003 | 0.4730 | 0.0371 | 1.6356 | 0.1255 |
| 0.100 | 0.0280 | −0.0004 | 0.6065 | 0.0474 | 2.1805 | 0.1593 |

TABLE 11

Accuracy of estimating the first pulse; pulses were 30 samples apart

| σ | Average Error | | Standard Deviation | | 99.9% Quantile | |
|---|---|---|---|---|---|---|
|  | Time | Amplitude | Time | Amplitude | Time | Amplitude |
| 0.001 | 0.0001 | −0.0000 | 0.0050 | 0.0003 | 0.0163 | 0.0009 |
| 0.005 | 0.0005 | −0.0000 | 0.0251 | 0.0014 | 0.0817 | 0.0044 |
| 0.010 | 0.0009 | −0.0000 | 0.0503 | 0.0027 | 0.1642 | 0.0089 |
| 0.050 | 0.0012 | 0.0000 | 0.2512 | 0.0137 | 0.8040 | 0.0444 |
| 0.080 | −0.0023 | 0.0000 | 0.4063 | 0.0221 | 1.4132 | 0.0736 |
| 0.100 | −0.0060 | 0.0001 | 0.5151 | 0.0279 | 1.7464 | 0.0926 |

TABLE 12

Accuracy of estimating the second pulse; pulses were 30 samples apart

| σ | Average Error | | Standard Deviation | | 99.9% Quantile | |
|---|---|---|---|---|---|---|
|  | Time | Amplitude | Time | Amplitude | Time | Amplitude |
| 0.001 | 0.0002 | −0.0000 | 0.0050 | 0.0003 | 0.0165 | 0.0009 |
| 0.005 | 0.0011 | −0.0000 | 0.0251 | 0.0014 | 0.0827 | 0.0045 |
| 0.010 | 0.0023 | −0.0000 | 0.0501 | 0.0027 | 0.1655 | 0.0089 |
| 0.050 | 0.0110 | −0.0000 | 0.2507 | 0.0137 | 0.8351 | 0.0447 |
| 0.080 | 0.0173 | −0.0000 | 0.4062 | 0.0220 | 1.4523 | 0.0740 |
| 0.100 | 0.0222 | −0.0000 | 0.5158 | 0.0277 | 1.7947 | 0.0941 |

It should be noted that the accuracy of estimating the first and the second pulses is very similar. This may be due in part to the fact that, mathematically, any region where there are two overlapping pulses is indistinguishable from a single pulse (that is, it can be written as a linear combination of two decaying exponentials). The disadvantage of this is that when there is pulse pile-up, the accuracy of estimating any of the pulses in the pile may, it is speculated, be limited by the smallest number of samples between consecutive pulses.

Twenty-Sample Technique

Figure 14:
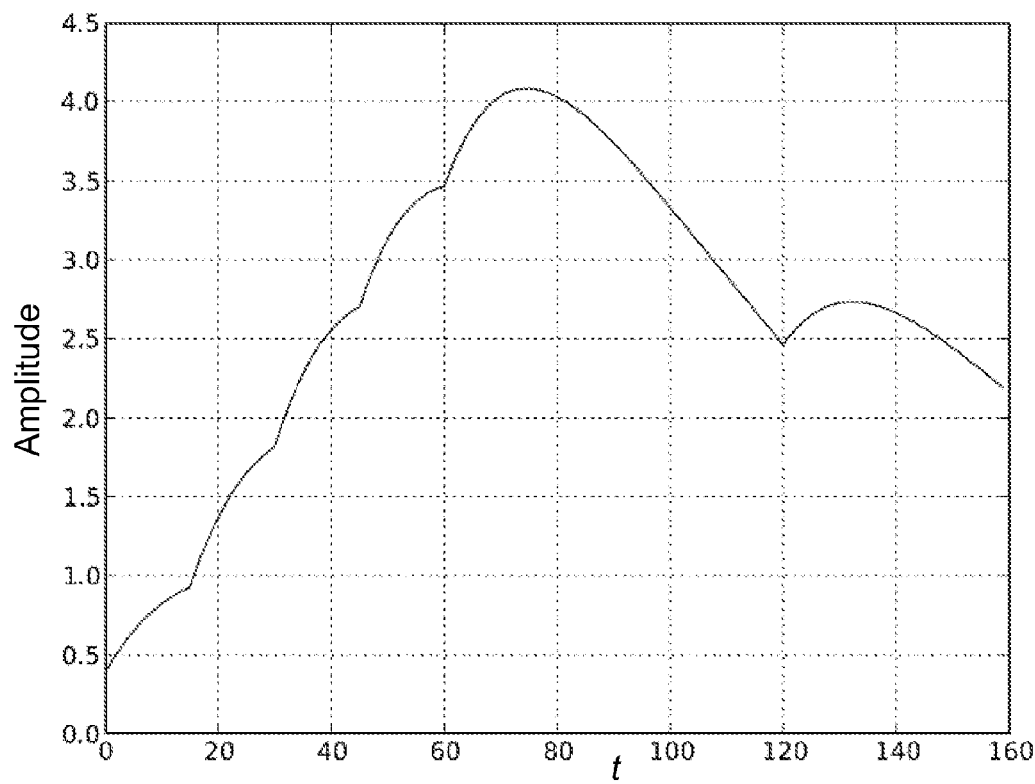
FIG. 14 is a plot of pulse pulse-up in a noise-free signal used to test a 'Twenty-Sample' pulse identification method according to a second embodiment of the present invention.

This section presents a technique for dealing with pulse pile-up in a sequential manner. A test signal was used (see FIG. 14), comprising six pulses all of unit amplitude and having start times of −5, 15, 30, 45, 60 and 120. Data is available for sample times 0 to 159 inclusive, and estimates are to be made for the five pulses with positive start times.

Figure 15:
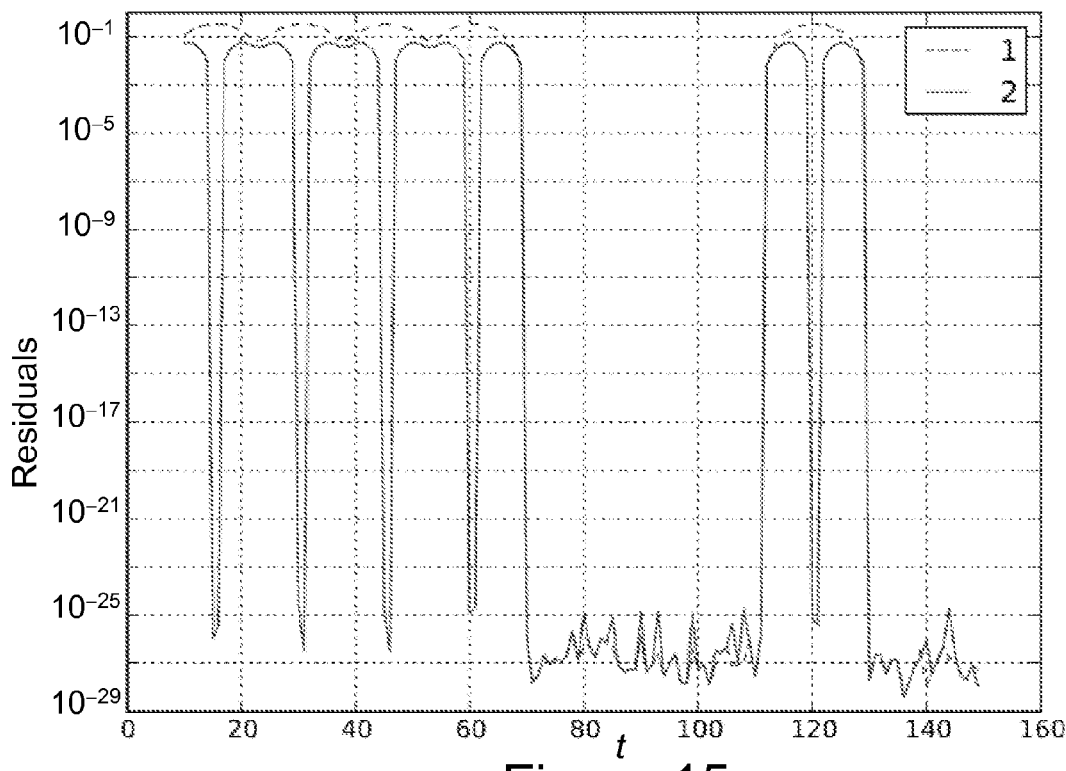
FIG. 15 is a plot of residuals when fitting either 1 or 2 pulses to a sliding window of length 20 (in which any value below $10^{-21}$ is numerical error) according to the second embodiment.

This technique uses a sliding window of size twenty samples. FIG. 15 is a plot of the residual when a single pulse (with a start time less than or equal to zero and a positive amplitude) is fitted to the twenty samples (dashed curve), and a plot of the residual when two pulses are fitted (solid curve). (If k denotes the horizontal axis, the samples being used are from k−10 to k+9 inclusive. When fitting two pulses, the first pulse is fit to the samples in the segment k−10 to k−1, and the second pulse is fit to the samples in the segment k to k+9. Both pulses are constrained to have a non-positive start time and a positive amplitude. The second pulse is further constrained to have a start time greater than or equal to −1.)

The reason why the troughs of the solid curve are not steeper is that a pulse starting at time k will be estimated essentially perfectly (in the noise free case) when the window is not only at location k but also at k+1. In the latter case, the pulse will be estimated to have a start time of −1.

Fitting a single pulse leads to large residuals if, in fact, a new pulse has occurred in the window. Conversely, fitting two pulses leads to large residuals if a new pulse has occurred somewhere in the window but not in the centre of the window. (If the window contains just a single pulse then fitting two pulses will also work reasonably well because the second pulse will simply have an estimated amplitude of zero.)

The idea then is to look for when the dashed curve is large and the solid curve is small; this combination signals the likelihood of a new pulse having just started.

Figure 16:
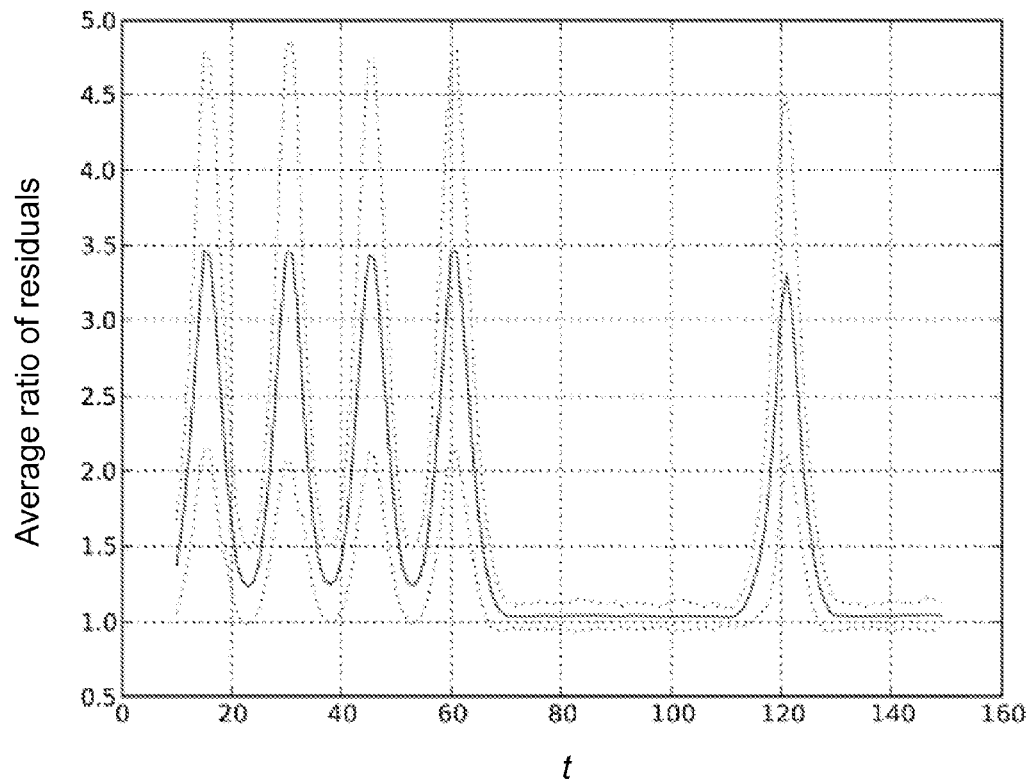
FIG. 16 is a plot of average ratio of residuals (solid curve) when fitting a sliding window of length 20 with σ=1 and of plus-and-minus one standard deviation from the mean (dotted curve) according to the second embodiment.

FIG. 16 plots the ratio of residuals (equivalent to subtracting the solid curve from the dashed curves of FIG. 15) when the noise variance is 0.12, determined from a thousand simulations; the solid curve in FIG. 16 is the sample mean and the dashed curve denotes the sample standard deviation.

A sliding window was then slid across the data and the ratio of residuals computed for each position k. Local maxima of the ratios were sought; a ratio was considered a local maximum if and only if no other ratio was larger than it in the 5 previous or 5 subsequent ratios. (In order to increase the chances of the first pulse being detected, this approach was modified to allow the first 4 ratios to be considered if there was no greater ratio in the first 10 ratios.) A local maximum was considered relevant if it exceeded 2.0, that is, the fit using two pulses was at least twice as good as the fit using a single pulse.

The results are given in the following tables. These results are not comprehensive but convey how well this approach was found to perform. Table 13 shows the number of successes out of the 1000 trial runs that were performed. A trial was considered a success if 5 pulses were found in the data, and each pulse was within 5 samples of its correct position.

TABLE 13

| σ | Successes | Failures | Total |
|---|---|---|---|
| 0.0010 | 984 | 16 | 1000 |
| 0.0050 | 983 | 17 | 1000 |
| 0.0100 | 982 | 18 | 1000 |
| 0.0500 | 987 | 13 | 1000 |
| 0.0800 | 967 | 33 | 1000 |
| 0.1000 | 893 | 107 | 1000 |

Tables 14 to 17 consider only the successful trials. They report, for each of the sets of 1,000 trials, the sample mean (or average) and sample standard deviation of the errors in estimating the amplitude and location of each of the five pulses.

TABLE 14

| | Average Error (Location) | | | | |
|---|---|---|---|---|---|
| σ | Pulse 1 | Pulse 2 | Pulse 3 | Pulse 4 | Pulse 5 |
| 0.0010 | 0.0003 | 0.0005 | −0.0001 | 0.0001 | 0.0002 |
| 0.0050 | −0.0012 | −0.0001 | −0.0006 | −0.0015 | 0.0017 |
| 0.0100 | 0.0041 | 0.0002 | 0.0052 | −0.0007 | −0.0014 |
| 0.0500 | 0.0164 | −0.0016 | −0.0067 | 0.0157 | 0.0314 |
| 0.0800 | −0.0090 | 0.0234 | 0.0043 | 0.0537 | 0.1525 |
| 0.1000 | 0.0191 | 0.0461 | 0.0143 | 0.0641 | 0.2766 |

TABLE 15

| | Average Error (Amplitude) | | | | |
|---|---|---|---|---|---|
| σ | Pulse 1 | Pulse 2 | Pulse 3 | Pulse 4 | Pulse 5 |
| 0.0010 | 0.0001 | 0.0002 | 0.0001 | 0.0002 | 0.0001 |
| 0.0050 | 0.0009 | 0.0005 | 0.0007 | 0.0003 | 0.0008 |
| 0.0100 | 0.0019 | 0.0015 | 0.0012 | 0.0013 | 0.0019 |
| 0.0500 | 0.0115 | 0.0134 | 0.0149 | 0.0106 | 0.0143 |
| 0.0800 | 0.0498 | 0.0453 | 0.0546 | 0.0483 | 0.0445 |
| 0.1000 | 0.0745 | 0.0797 | 0.0825 | 0.0812 | 0.0623 |

TABLE 16

| | Standard Deviation (Location) | | | | |
|---|---|---|---|---|---|
| σ | Pulse 1 | Pulse 2 | Pulse 3 | Pulse 4 | Pulse 5 |
| 0.0010 | 0.0093 | 0.0088 | 0.0088 | 0.0090 | 0.0092 |
| 0.0050 | 0.0446 | 0.0438 | 0.0454 | 0.0457 | 0.0456 |
| 0.0100 | 0.0922 | 0.0900 | 0.0924 | 0.0903 | 0.0949 |
| 0.0500 | 0.5864 | 0.5479 | 0.5505 | 0.5794 | 0.5382 |
| 0.0800 | 1.0477 | 1.0345 | 1.0377 | 1.0521 | 0.9728 |
| 0.1000 | 1.2740 | 1.2537 | 1.2986 | 1.2712 | 1.2142 |

TABLE 17

| | Standard Deviation (Amplitude) | | | | |
|---|---|---|---|---|---|
| σ | Pulse 1 | Pulse 2 | Pulse 3 | Pulse 4 | Pulse 5 |
| 0.0010 | 0.0017 | 0.0018 | 0.0018 | 0.0017 | 0.0018 |
| 0.0050 | 0.0089 | 0.0089 | 0.0090 | 0.0089 | 0.0093 |
| 0.0100 | 0.0173 | 0.0173 | 0.0174 | 0.0175 | 0.0175 |
| 0.0500 | 0.0849 | 0.0861 | 0.0872 | 0.0874 | 0.0826 |
| 0.0800 | 0.1323 | 0.1378 | 0.1316 | 0.1292 | 0.1321 |
| 0.1000 | 0.1568 | 0.1600 | 0.1605 | 0.1556 | 0.1411 |

Baseline Offset Removal

The apparatus of FIG. 1 can be varied—in particular in the method implemented by the modules of processor 54—to remove the effects of a DC bias in the input data stream.

In order to obtain accurate estimates of the amplitude of pulses, it is necessary that any DC bias in the input signal be removed or compensated for. This is particularly difficult to do at very high count rates. When the average pulse arrival time is less than the impulse response time of the detector, the output of the detector rarely (if ever) returns to the baseline. In order to accurately estimate the baseline, the effects of the pulses should be removed.

One method of doing this is to include a constant component as part of the superposition of functions that model $f(t)$. The disadvantage of this is that it increases the degrees of freedom available to the Least Squares Fitter 56, resulting in poorer pulse detection and parameter estimation performance.

A more effective method of removing the baseline from the data is to observe the output residual of Least Squares Fitter 56. When there are no pulses present in the window of interest, Least Squares Fitter 56 attempts to apply the model to the noise and to any baseline offset introduced by the system. The residual output is typically a strictly positive function (such as the sum-of-the-absolutes or sum-of-squares) of the difference between the actual data and the model prediction. The residual attains its minimum when there is no contribution from baseline offset, that is, the baseline offset is zero. Consequently by adjusting the baseline value of the input signal in such a way as to minimize the residual, the baseline is effectively removed. This adjustment mechanism can be implemented using a feedback loop, or by more sophisticated advanced control theory techniques.

For example, the output of Least Squares Fitter 56 is slightly affected by the presence of pulses (though much less than the actual input data). The presence of a pulse typically drives the residual value higher for a number of samples equal to the window length. As the residual output is strictly positive, the effect of pulses can be removed by ignoring all but the smallest residual values (such as the lowest 10% of residual values), which are unlikely to be influenced by pulses, and provide an excellent signal for driving a control system to track and remove the baseline from the data.

A more advanced method applies the technique three times to the same input data. It is appreciated that each 'iteration' of the technique may be performed simultaneously using parallel hardware. The order in which the residuals are calculated is not important. On one iteration, a variable offset is applied to the input data. The residual is calculated as described previously. On the second iteration, the variable offset plus a known fixed offset is applied to the same data prior to performing the fitting and obtaining the residual. On the third iteration, the variable offset minus a known fixed offset is applied to the same data prior to performing the fitting and obtaining the residual. The difference between the residual obtained by the data with positive fixed offset, and the residual obtained by the data with negative fixed offset can be used to drive a control loop. The control loop adjusts the variable offset that is applied to all three data sets. When any DC bias in the input data has been cancelled by the variable offset, the difference between the two offset-residuals will be zero.

Multiple Signal Forms

The gamma-ray spectroscopy apparatus of FIG. 1 can be modified to process a data stream that consists of a plurality of pulse shapes, each of which can be modelled as a superposition of (potentially completely independent and different) functions. The functions need not be a sum of exponentials. In such embodiments, processing unit 50 of signal processing unit 18 of the apparatus includes a plurality of like Least Squares Fitters 56, each configured to fit a particular pulse shape. That Least Squares Fitter 56 that produces the smallest error residual for a given sample window position is deemed to have the model that is closest to the underlying pulse shape, and the estimates generated by this particular Least Squares Fitters 56 can be used for pulse detection, amplitude and location parameter estimates. Alternatively, the residual outputs of all the Least Squares Fitters 56 can be further processed (such as by lookup table, interpolation, classification or other methods) to obtain a better estimate of the true pulse shape.

When processing pulse shapes that are not simply a sum of exponentials, it may be helpful to include a fitter that attempts to fit the data with the assumption that no pulse is present. The residue from each fitter is compared with the residue from the fitter that assumed no pulse was present. This allows the significance of the residue from each fitter to be scaled appropriately, and to determine if the residual values indicate the presence of a pulse, or are simply due to noise.

One way the residual values can be compared is to form a group of ratios, one for each pulse-shape residual.

ratio($n$)=residual('no pulse' fitter)/residual($N$th pulse shape fitter).

These ratios are typically close to unity when no pulses are present, and much greater than unity when a pulse is present.

Variable Window Length

Some of the embodiments of the invention described hereinabove use a fixed window length that remains unchanged throughout the course of data processing. In other embodiments, however, the apparatus varies the length of the window during the course of processing in response to the incoming data, to obtain more favourable estimates of pulse parameters. FIGS. 3A and 3B demonstrate the effect of window sizes, and hence indicate the trade-off that is possible between window length and the accuracy of pulse parameter estimates.

Further Embodiments

The present invention may find still greater application in the field of semiconductor base radiation detectors. The following embodiments thus illustrate the use of the present invention with silicon drift diode detectors and in X-ray micro-analysis using an electron microscope.

Figure 17:
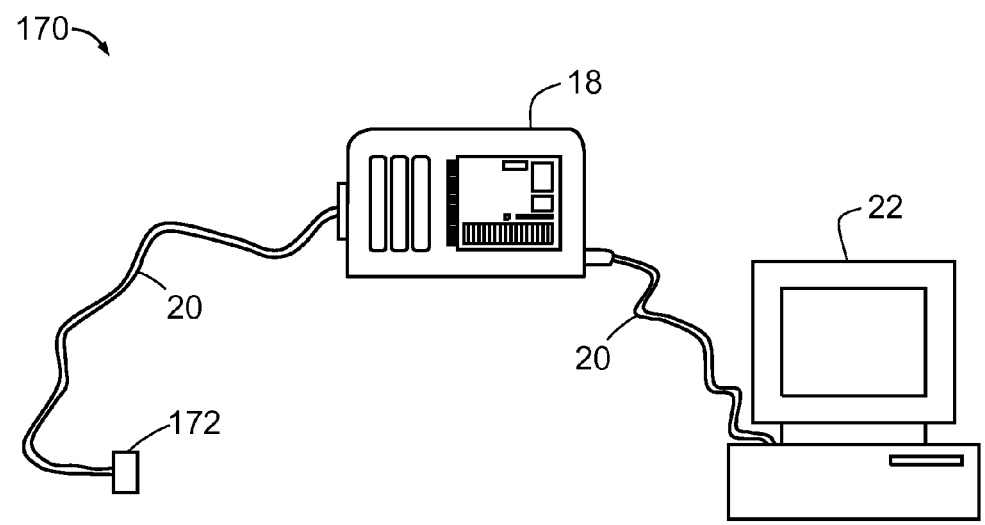
FIG. 17 is a schematic view of a spectroscopy apparatus adapted to perform pulse pile-up recovery according to another embodiment of the present invention.

Hence, according to another embodiment of the present invention, there is provided a spectroscopy apparatus adapted to perform pulse pile-up recovery according to another embodiment of the present invention, shown generally at 170 in FIG. 17. Spectroscopy apparatus 170 includes a detector 172, in the form of a silicon drift diode (SDD) detector of a type used for the detection and measurement of X-rays in energy dispersive X-ray spectrometry, a signal processing unit 18 (comparable to that of FIG. 1), a computer 22 for display and cables 20 for coupling the output of signal processing unit 18 to computer 22.

Figure 18:
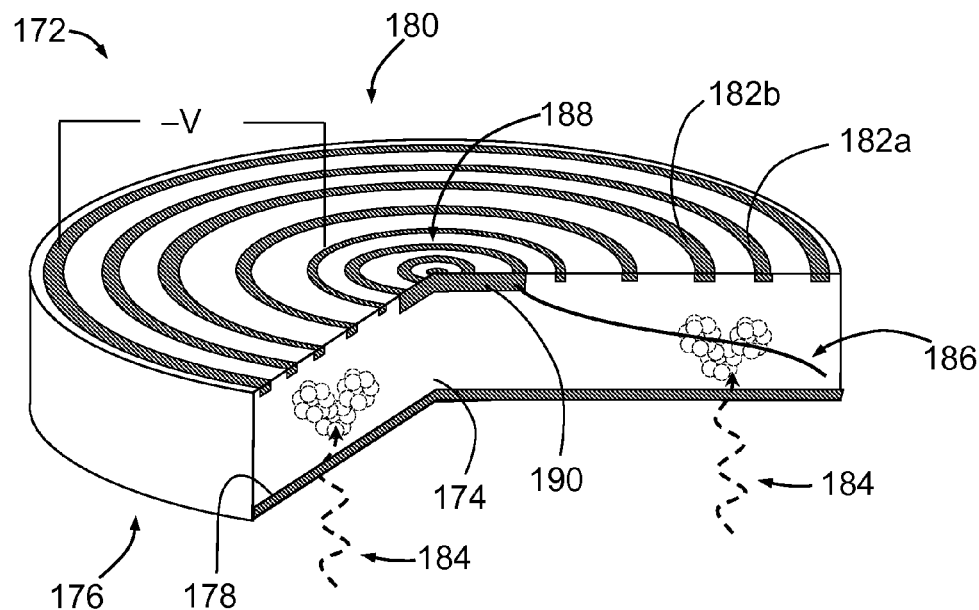
FIG. 18 is a schematic, cut-away view of the silicon drift diode (SDD) detector of the spectroscopy apparatus of FIG. 17.

FIG. 18 is a schematic, cut-away view of silicon drift diode (SDD) detector 172. Detector 172 is constructed of high resistivity, high purity n-type silicon 174, which is of the order of 450 μm in depth and has an active surface area of 10 to 100 mm². The active area of the incident face 176 of detector 172 (viz. the window side, on which X-ray radiation is normally incident in use) is covered by a thin junction 178 of homogenous p-type silicon. The rear side 180 of detector 172 (viz. the device side) has p-type concentric drift ring electrodes 182a, 182b with integrated voltage dividers (not shown).

A transverse electrical potential field is created across the thickness of detector 172 by a structure of evenly spaced electrodes on its front and back surfaces. Furthermore a strong radial collection field is created by the patterning of concentric ring electrodes 182a, 182b. These electrodes create both a radial and transverse electrical field to produce a 'collection channel'.

X-rays 184 impinging upon and interacting within detector 172 produce electron-hole pairs; the number of pairs created is proportional to the energy of the incident X-ray. The free electrons drift through detector 172 along a collection channel 186 defined by the electric potential field within detector 172, and are collected at a central, electron collecting anode 188. The electric charge, collected on the central anode 188 is amplified, in a first stage amplification process, by a field effect transformer (FET) 190, integrated into the detector 172. The signal outputted by anode 188 is then amplified and shaped by signal processing unit 18 as digitised detector output data (see FIG. 19).

An important benefit of the structure of silicon drift diode detector 172 is the low capacitance of anode 188, resulting in low electronic noise. This enables better energy resolution and higher counting rates than some other X-ray detectors, such as Si-PIN photodiodes or Si(Li) crystals.

Figure 19:
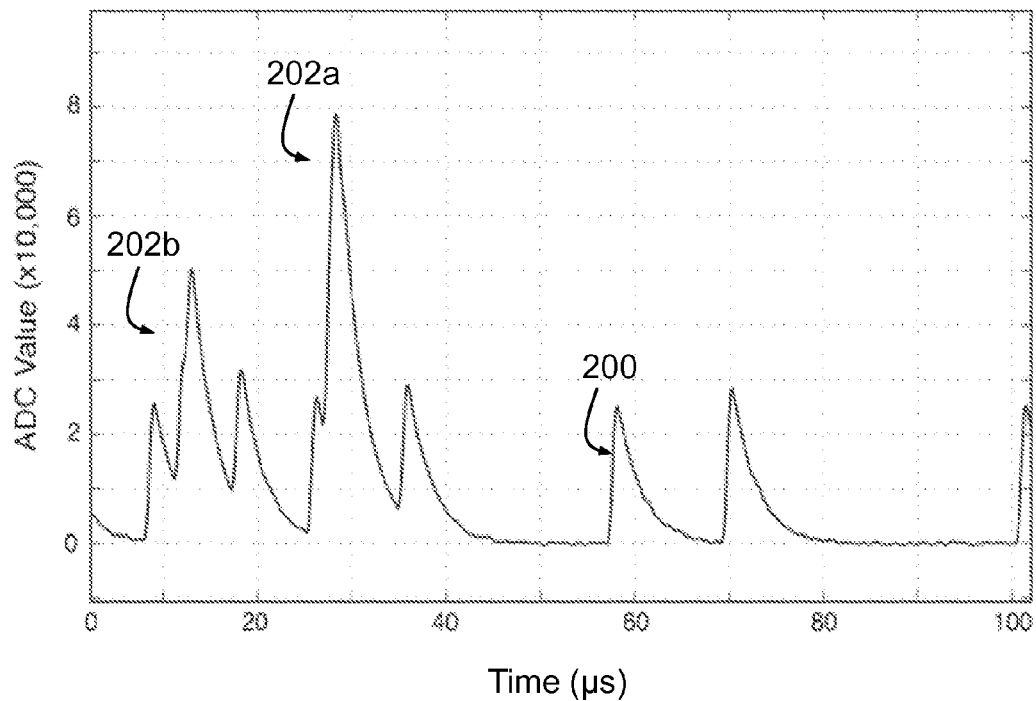
FIG. 19 depicts approximately 100 μs of data outputted from a silicon drift diode detector of the type shown in FIG. 18.

FIG. 19 depicts approximately 100 µs of data outputted from a silicon drift diode detector of the type shown in FIG. 18. The charge collected on anode 188 was amplified and shaped by pulse shaping and amplifying electronics, as discussed above; FIG. 19 depicts the resulting signal. The signal shape that results from detection of a single X-ray is evident in this digitized detector output at 200. However, there are circumstances in which multiple X-ray events will interact with the detector in quick succession. In such circumstances, evident at 202a, 202b, detector 172 does not recover from one event (i.e. the signal does not return to baseline) before the next event occurs, leading to pulse pile-up. It will be seen, therefore, that spectroscopy apparatus 170 is susceptible to pulse pile-up, so signal processing unit 18 is employed as described above to determine the location and amplitude of pulses in the output of detector 172.

The spectroscopy apparatus may take a number of different forms depending on the implementation, for example, a metal detector, a landmine detector, an imaging apparatus (such as a medical imaging apparatus), a mineral detection apparatus, an oil well logging apparatus, an unexploded ordnance detector, a cargo screening apparatus, a baggage screening apparatus, an X-ray fluorescence apparatus, an X-ray diffraction apparatus, an X-ray absorption spectroscopy apparatus, an X-ray backscatter apparatus, a small angle neutron scattering apparatus, a powder diffractometer apparatus, a neutron reflectometer apparatus, an oil exploration apparatus, a scanning electron microscope apparatus, a semiconductor radiation detector (such as a silicon drift detector apparatus, Cadmium Zinc Telluride detector apparatus, or a High Purity Germanium (HPGe) detector apparatus), a vibration detector such as a seismic reflection apparatus, a radio detection and ranging (RADAR) apparatus, a sound navigation and ranging (SONAR) apparatus, an elemental detection and measurement apparatus, a radiation safety detection apparatus, a biological assay apparatus (such as a Flow Cyclometry apparatus or a Radioimmunoassay) or a superconducting apparatus (such as a superconducting tunnel junction apparatus or a superconducting calorimeter).

Figure 20:
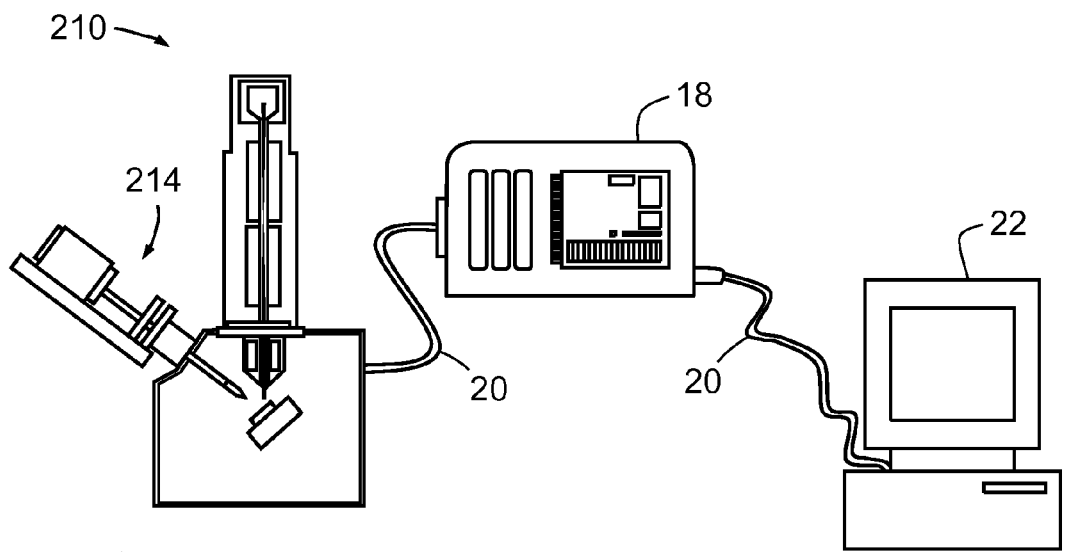
FIG. 20 is a schematic view of an X-ray microanalysis apparatus adapted to perform pulse pile-up recovery according to another embodiment of the present invention.

According to another embodiment of the present invention, there is provided an X-ray microanalysis apparatus adapted to perform pulse pile-up recovery according to another embodiment of the present invention, shown schematically at 210 in FIG. 20. X-ray microanalysis apparatus 210 includes a detector in the form of an electron microscope 212 (with attached Energy Dispersive Spectrometry (EDS) system 214), a signal processing unit 18 (comparable to that of FIG. 1), a computer 22 for display and cables 20 for coupling the output of signal processing unit 18 to computer 22. Signal processing unit 18 determines the location and amplitude of pulses in the output of electron microscope 212, as described above.

Figure 21:
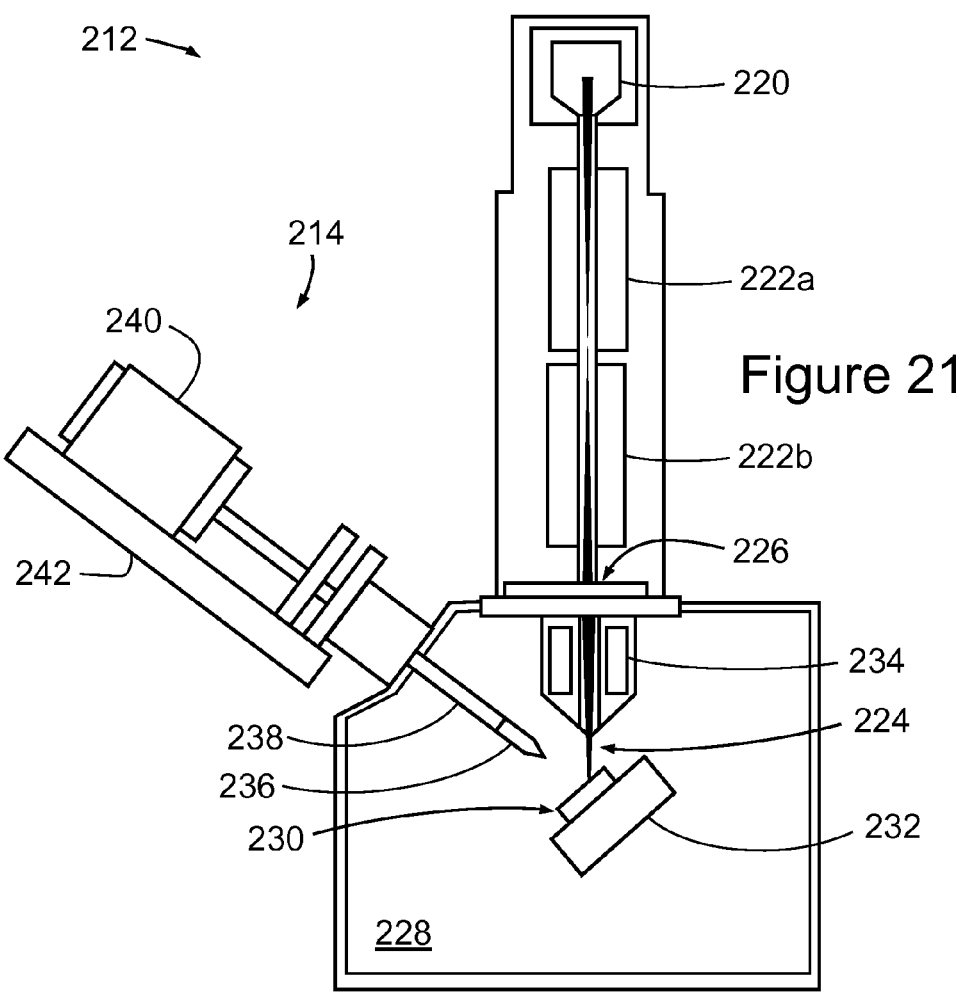
FIG. 21 is a schematic view of the electron microscope with attached EDS system of the X-ray microanalysis apparatus of FIG. 21.

FIG. 21 is a schematic view of electron microscope 212 with attached EDS system 214. In use, an electron gun 220 is used to produce a beam of electrons, which is focused by a pair of successive condenser lenses 222a, 222b. The resulting, focused beam of electrons 224 passes through an aperture 226 into a vacuum chamber 228 of the electron microscope 212, which electron beam 224 impinges upon a specimen 230 mounted on a stage 232 within chamber 228. The focused electron beam 224 may be scanned across specimen 230 using scanning coils 234.

When electron beam 224 impinges upon specimen 230, electrons are ejected from specimen 230, leading to a cascade of electrons from higher to lower energy orbital and the emission of X-rays. These X-rays have wavelengths unique to the elements making up specimen 230, so can be used to characterize those elements.

The analysis of the emitted X-rays commences with EDS system 214, which is mounted to the outside of electron microscope 212. EDS system 214 comprises a silicon drift diode (SDD) detector 236, attached to the end of a cold finger 238. Cold finger 238 is used to cool the surface of detector 236 to, for example, -25° C. The output signal from SDD detector 236 is amplified and processed by pulse shaping electronics (not shown) housed in the body 240 of EDS system 214. Ultimately the energy of the florescent X-rays is determined by signal processing unit 18. EDS system 214 is mounted on an automated variable movement stage 242 to enable automated control over the distance between SDD detector 236 and specimen 230.

FIG. 19 depicts the digital time series formed from X-rays emitted from the EDS system 214 and captured by the silicon drift diode (SDD) detector 236. The area under the individual pulses 200 defines the energy deposited on the detector by the emitted X-rays.

Figure 22:
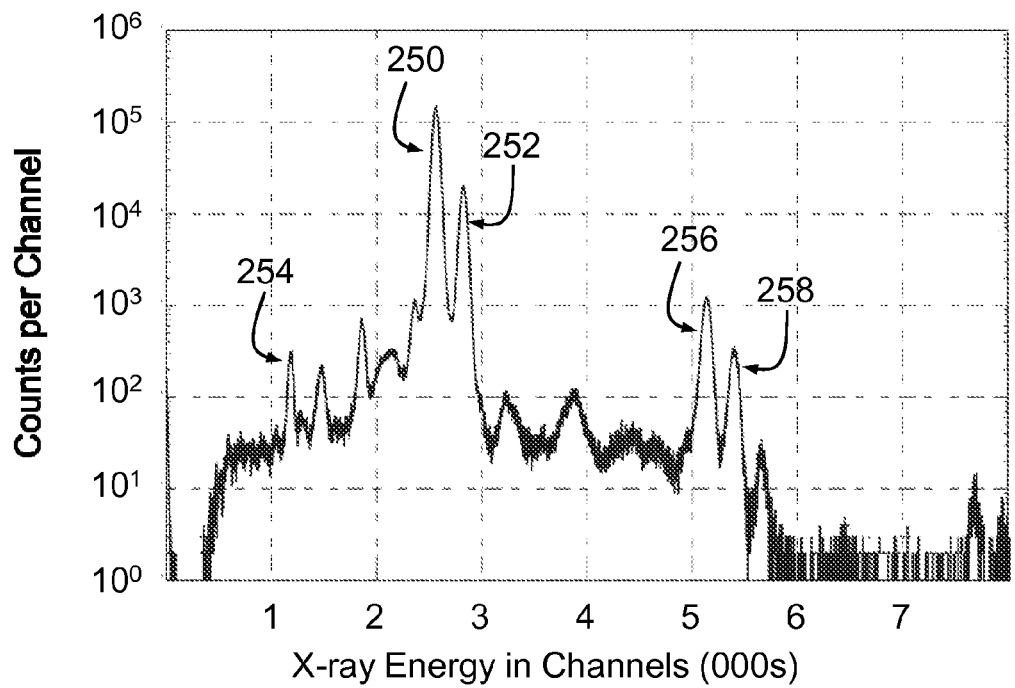
FIG. 22 is depicts an X-ray energy spectrum, collected using a SDD detector of the type used in the X-ray microanalysis apparatus of FIG. 20.

FIG. 22 depicts an X-ray energy spectrum, collected using a SDD detector (cf. FIGS. 17 and 18) configured to measure fluorescent X-rays emitted from a sample of stainless steel. An X-ray tube was used to stimulate the emission of fluorescent X-ray. The relative energy of the fluorescent X-rays is indicated along the X-axis; the total number of energy channels in this spectrum is 8,192 channels. The Y-axis indicates on a logarithmic scale the number of events recorded at each energy channel.

The spectrum of FIG. 22 represents a total data collection of 60 seconds; the input count rate (ICR) of the SDD detector (the number of events interacting with the detector each second) was approximately 153,200 events per second. The output count rate (OCR) of the SDD detector (the number of events coming out of the EDS system each second) was approximately 131,700 events per second; the system dead time (the difference between the ICR and the OCR) was 14%. The energy resolution of this X-ray spectrum, defined as the full width of the main peak at half its maximum value (FWHM), was 159 electron volts (eV) or 2.48%.

The most common fluorescence X-ray from naturally occurring iron (which is predominantly 55Fe) has an energy of 6.40 keV. In the energy spectrum of FIG. 22, this X-ray emission peak is shown at 250, at approximately channel 2,550. Another fluorescence X-ray known to be characteristic of 55Fe is the emission peak at 7.06 keV, visible at 252 in the X-ray energy spectrum of FIG. 22. Less common X-ray fluorescence from other elements in the sample (or surrounding air) can also be seen in the energy spectrum at 254.

Two additional, distinct peaks are visible (at 256 and 258) between channels 5,000 and 5,500. These peaks are not due to high energy fluorescence X-rays but rather to the superposition of signals from the lower energy characteristic peaks of 55Fe, the 6.40 keV and 7.06 keV (at 250 and 252) respectively. The superposition of these peaks, owing to pulse pile-up, occurs in the output of the SDD detector when radiation events arrive at the detector in such quick succession that the detector cannot adequately recover from the first event (the detector output signal does not return to baseline) before the arrival of subsequent signal.

Pulse pile-up in the digitized output of a SDD detector causes pile-up peaks in the X-ray energy spectrum these peaks can interfere with accurate material characterization as they may mask spectral peaks from other fluorescence X-rays originating in the sample. Hence, signal processing unit 18 is employed as described above to determine the location and amplitude of pulses in the output of the SDD detector.

The approach of the present invention may be applied in many other fields. For example, pulse pile-up is a problem in seismic data processing. Some existing approaches are computationally intensive (even if producing good results); the method of the present invention can be applied to the processing of seismic data without excessive computational overhead such that a relatively fast and inexpensive alternative approach is provided, even if in some applications the results are not as good as are provided by some existing techniques.

Figure 23:
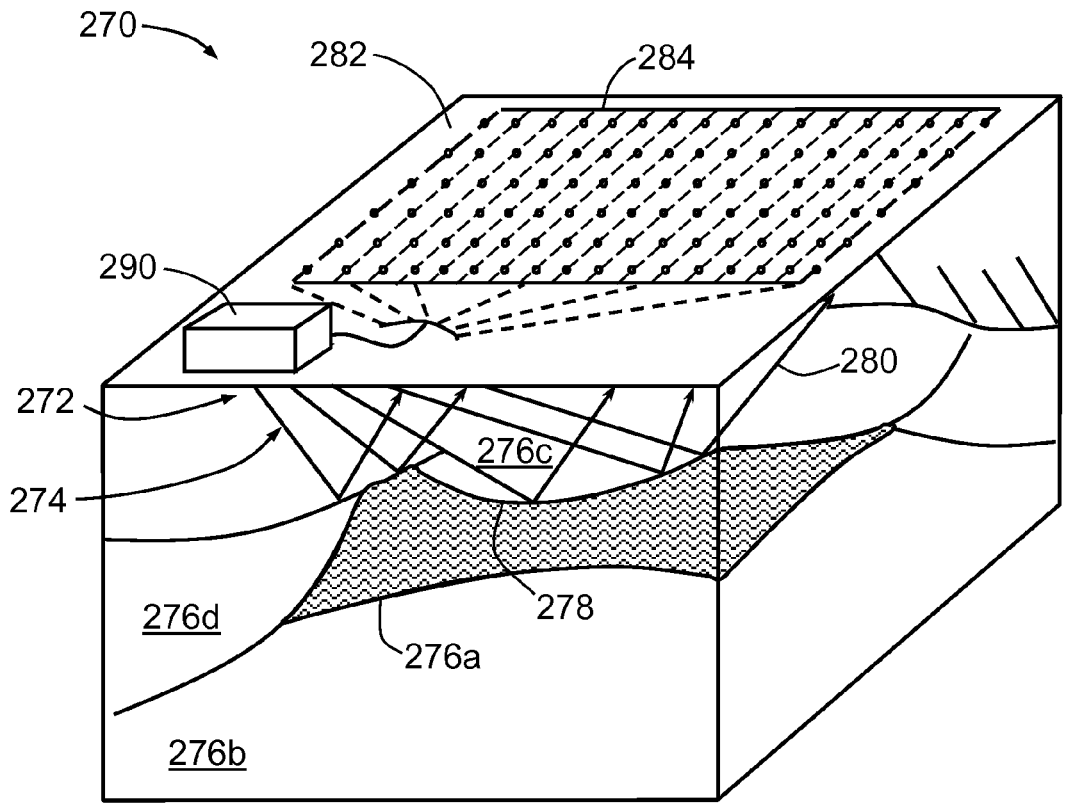
FIG. 23 is a schematic view of a reflection seismology system according to another embodiment of the present invention

FIG. 23 is a schematic view of a reflection seismology system 270 according to another embodiment of the present invention, as used to employ sonic energy to perform subsurface exploration for—in this example—oil. Sonic reflection, or reflection seismology, is a technique for geophysical exploration using the principles of seismology to determine the properties of the subsurface environment.

Referring to FIG. 23, reflection seismology is conducted by initiating seismic waves into the Earth's subsurface at an initiation point 272 using an explosion, vibrators or specially designed air gun (not shown). The seismic waves 274 thus generated are a type of elastic wave that is conducted through the Earth. Different types of subsurface material (276*a,b,c,d*), such as granite, shale, gas or oil 276*a*, have different acoustic impedances so, when the initiated seismic waves 274 encounter a boundary 278 between materials (in this example, between materials 276*a* and 276*c* with different acoustic impedances, some of the wave energy will be transmitted through the boundary and a portion of the wave energy will be reflected 280 off the boundary 278. The amplitude of the reflected wave 280 depends on the magnitude of the wave coming into the boundary, the angle at which the wave intersects the boundary and the impedance contrast between the two materials 276*a,c*.

The portion of the seismic wave that is reflected back from boundary to the Earth's surface 282 is detected by seismometer array 284. Seismometer array 284 comprises a plurality of individual geophones that convert ground motion, induced by the reflected seismic waves, into electrical signals. In use, geophones are coupled into the Earth's surface, and connected together with cables. The electrical signals output by the geophones are then recorded at a recording station 290 for further analysis and processing. Recording station 290 includes a pulse processing board comparable to pulse processing board 18 of FIG. 1, adapted to receive and process the electrical signals output by geophones, to resolve individual signals in the output of geophones. It should be noted that, in some applications of this technique, there may be a single detonation point with multiple sonic detectors for the recording of the reflected seismic waveforms. In other applications multiple detonation sites may be used in conjunction with a multitude of sonic detection sites to determine a more robust model of the sub surface environment.

A comparable system according to another embodiment of the present invention may be used for conducting exploration surveys in ocean environments. In this embodiment, the system comprises a ship towing an array of pneumatic air guns as an excitation source. These guns emit low frequency sound pulses (up to 300 Hz and 250 dB) into the ocean to stimulate seismic waves in the seabed below. The system also includes multiple seismic cables for detecting the reflected seismic waves; the cables—which are typically deployed in parallel—are, in this embodiment, at least 6 kilometers in length and spaced 150 meters apart, and provided with hydrophones at regular intervals along each cable to record the sound signals reflected off features beneath the seabed. The system, according to this embodiment, includes a pulse processing board (on the ship) comparable to pulse processing board (18) of FIG. 1 for receiving and processing the output of the hydrophones in order to resolve individual signals in the output of those hydrophones.

Reflection seismology is the primary form of exploration for hydrocarbons in both the land and ocean environments and can be used to find other resources including coal, ores, minerals and geothermal energy. For more detection of shallow subsurface features, up to a few tens of meters in depth, electromagnetic waves can be used instead of elastic waves, a technique referred to as ground penetrating radar. All such systems can, according to other embodiments of the present invention, include a pulse processing board comparable to pulse processing board 18 of FIG. 1 for processing the output of the sonic or radar detectors in order to resolve individual signals in the output of those respective detectors.

The method of the present invention may also be employed in many material or product analysis fields. For example, semiconductor processing and fabrication employs high resolution measurement devices and techniques for evaluating parameters of samples; various measurements are performed in which thin films—such as oxides, metals or dielectrics—are deposited on semiconductor substrates of, for example, silicon. Non-destructive techniques are particularly useful for evaluating thickness, identifying impurities and determining the index of refraction of the films to ensure high yields during fabrication. One type of data that is particularly useful in semiconductor fabrication is that relating to the dose and profile of ion implantation of dopants such as arsenic, phosphorus and boron; this data may be obtained with X-ray fluorescence measurements performed at varying small angles, and collected using—for example—an energy-dispersive solid-state detector such as a Si(Li) detector. The method of the present invention may be used to process the output of such a detector in this field.

In automated DNA sequencing, the problem of pulse pile-up (and hence dead-time) may be avoid by ensuring that only one nucleotide is present in a detection region at any given time. However, the need to do so should be substantially reduced—permitting greatly faster data collection—by the use of the method of the present invention.

Similarly, the widespread use of miniaturized electronic circuits creates the need for sophisticated analytical techniques capable of high resolution measurement. For example, photoluminescence lifetime spectroscopy is used to measure photoluminescence in semi-conductors, especially those of compounds such as gallium arsenide that are susceptible to the incidence of structural discontinuities due to local crystallisation defects. Such defects are detected as variations in photo luminescent output, measured with—for example—single photon avalanche diode (SPAD) detectors. The output of such detectors is processed to allow the measurement of the photo luminescent lifetime delay characteristics of the sample under inspection. The rapid decay of photoluminescence in GaAs substrates, for example, allows the use of high repetition rate pulsed laser sources, theoretically permitting a data collection rate of 500,000 counts per second. In practice, pulse pile-up limits the maximum data collection rate in such applications to around 100,000 counts per second due to the finite conversion dead time of even faster commercially available time-to amplitude converter. The method of the present invention, employed to process the data from such detectors, should allow significantly higher data collection rates in these applications.

APPENDIX

In the following, $u(t)$ is used to denote the unit-step function, equal to 0 for $t \geq 0$.

A low-pass filter with time-constant $\tau$ has an impulse-response of $$\frac{1}{\tau} e^{-\tau t} u(t).$$

(It can be implemented by placing in series a resistor and a capacitor. The time-constant is $\tau = RC$ where R and C are the values of the resistance and capacitance.) Its Laplace transform is $$\frac{1}{1+\tau s}.$$

For the impulse-response to have unit energy, it is scaled by $\sqrt{2\tau_3}$. For unit area, the scaling constant is $\tau^2$.

The convolution of $e^{-\alpha t} u(t)$ with $e^{-\beta t} u(t)$ is $$\frac{e^{-\alpha t} - e^{-\beta t}}{\beta - \alpha} u(t).$$

Two low-pass filters in series have an impulse response given by the convolution of $$\frac{1}{\tau_1} e^{-\tau_1 t} u(t) \text{ and } \frac{1}{\tau_2} e^{-\tau_2 t} u(t),$$

namely $$\frac{e^{-\tau_1 t} - e^{-\tau_2 t}}{\tau_1 \tau_2 (\tau_2 - \tau_1)} u(t).$$

The Laplace transform is $$\frac{1}{1+\tau_1 s} \frac{1}{1+\tau_2 s}.$$

Three low-pass filters in series have an impulse response of $$1/(\tau_1 \tau_2 \tau_3)(e^{(-\tau_1 t)}/(\tau_3 - \tau_1)(\tau_2 - \tau_1) - e^{(-\tau_2 t)}/(\tau_3 - \tau_2)(\tau_2 - \tau_1) + e^{(-\tau_3 t)}/(\tau_3 - \tau_2)(\tau_3 - \tau_1)) u(t)$$

The Laplace transform is $$\frac{1}{1+\tau_1 s} \frac{1}{1+\tau_2 s} \frac{1}{1+\tau_3 s}$$

Delaying a signal by d units of time corresponds to multiplying its Laplace transform by $e^{-ds}$. Therefore, a sequence of N scaled and translated but otherwise identical pulses would have a Laplace transform of the form:

$$\frac{1}{(1+\tau_1 s)(1+\tau_2 s)(1+\tau_3 s)} \sum_{k=0}^{N-1} A_k e^{-d_k s}$$

Neglecting the effects of noise, by taking the Laplace transform of the output signal and multiplying it by $$\frac{1}{(1+\tau_1 s)(1+\tau_2 s)(1+\tau_3 s)}$$

results in the problem of estimating the pulse amplitudes $A_i$ and delays $d_i$ from the additive mixture $$\sum_{k=0}^{N-1} A_k e^{-d_k s}.$$

For large $d_k$, the term $e^{-d_k s}$ decays rapidly, suggesting that the first "pile" of pulses can be estimated from $$\sum_{k=0}^{N-1} A_k e^{-d_k s}.$$

(The initial segment of data can then be discarded and a Laplace k=0 transform taken of the remaining data and the process repeated.)

It should be noted that, while this discussion describes taking a continuous-time Laplace transform, a discrete-time reformulation might be more appropriate in at least some cases.

Modifications within the scope of the invention may be readily effected by those skilled in the art. It is to be understood, therefore, that this invention is not limited to the particular embodiments described by way of example hereinabove.

In the claims that follow and in the preceding description of the invention, except where the context requires otherwise owing to express language or necessary implication, the word "comprise" or variations such as "comprises" or "comprising" is used in an inclusive sense, i.e. to specify the presence of the stated features but not to preclude the presence or addition of further features in various embodiments of the invention.

Further, any reference herein to prior art is not intended to imply that such prior art forms or formed a part of the common general knowledge.

The invention claimed is:

1. A method for locating a pulse in detector output data, comprising:
   generating, by a detector circuit, detector output data comprising at least one pulse corresponding to a radiation event in radiation received at the detector circuit from a specimen;
   receiving, at a processor circuit, the detector output data from the detector circuit;
   sliding, by the processor circuit, a window across the detector output data to successive window locations;
   identifying possible pulses by fitting one or more functions to the detector output data in the window at each of the window locations;
   determining which of the possible pulses have: i) a pulse start falling one, two or three samples before the start of the respective window location and ii) a peak amplitude exceeding the standard deviation of noise in the window at the respective window location;
   identifying as pulses those of said possible pulses that have: i) a pulse start falling one, two or three samples before the start of the respective window location and ii) a peak amplitude exceeding the standard deviation of the noise in the window at the respective window location;
   determining a location and the peak amplitude of each of the identified pulses from the one or more functions determined by said fitting; and
   employing security measures, diagnosing a medical condition, logging an oil well, screening goods, or locating an object based on the determined location and/or the determined peak amplitude of each of the identified pulses.

2. A method as claimed in claim 1, wherein said one or more functions are a function of time.

3. A method as claimed in claim 1, comprising providing said data in, or converting said data into, digital form before fitting said one or more functions to said data.

4. A method as claimed in claim 1, comprising:
   generating said detector output data by applying a mathematical transform to said detector output data, said mathematical transform being selected according to an expected form of said pulse.

5. A method as claimed in claim 1, wherein said fitting includes:
   fitting a plurality of functions to the detector output data; and
   determining a function of best fit, being whichever of said plurality of functions optimizes a chosen metric when modelling said data; and
   said determining includes determining the location and amplitude of said peak from the determined function of best fit.

6. A method as claimed in claim 1, comprising:
   determining error residuals from said fitting; and
   determining a baseline offset of said detector output from said error residuals.

7. A method as claimed in claim 1, wherein said one or more functions are of the general form:

$$f(t)=av(t)+be^{-\alpha t};$$

the method including calculating v(t) numerically according to:

$$v(t) = e^{-\alpha t}\sum_{k=0}^{t-1} e^{-(\beta-\alpha)k}$$

for t=1, 2, 3, ..., with v(0)=0.

8. A method as claimed in claim 1, including determining a location and amplitude of the pulse with a method comprising:
   defining a reference pulse p(t) as a convolution of $e^{-\alpha t}u(t)$ with $e^{-\beta t}u(t)$, and
   determining the location τ and amplitude A of f(t) from f(t)=Ap(t−τ), with τ≤0.

9. A method as claimed in claim 1, wherein said one or more functions are of the form:

$$f(t)=ae^{-\alpha t}be^{-\beta t},$$

wherein α and β are scalar coefficients, and said method comprises determining a and b,
wherein determining said location comprises determining a location $t_*(a,b)$ where:

$$t_*(a,b) = \frac{\ln\alpha - \ln\beta}{\alpha - \beta} + \frac{\ln a - \ln b}{\alpha - \beta}.$$

10. A method as claimed in claim 1, comprising forcing any estimates having the pulse starting within a window to start at a boundary of said window.

11. A method as claimed in claim 1, comprising maximizing window size or varying window size.

12. A method as claimed in claim 1, wherein said determining the location of the peak comprises minimizing an offset between the start of a window and a start of the pulse.

13. A method as claimed in claim 1, wherein each of said one or more functions is a superposition of a plurality of functions,
   the method comprising low-pass filtering the detector output data before fitting said one or more functions; and
   the method comprising adapting said one or more functions to allow for a low frequency artifact in said detector output data.

14. A method as claimed in claim 1, comprising transforming said detector output data with a transform before fitting said one or more functions to the detector output data as transformed, wherein said transform is a Laplace transform or a Fourier transform.

15. A method as claimed in claim 14, wherein each of said one or more functions is a superposition of a plurality of functions.

16. A method as claimed in claim 1:
wherein identifying possible pulses further comprises performing pulse fitting of either said function of best fit or of said plurality of functions to the data in the window at each window location.

17. A method for determining baseline offset, comprising:
fitting one or more functions to detector output data according to the method of claim 1;
determining error residuals from fitting said one or more functions; and
determining said baseline offset from said error residuals.

* * * * *